US008185591B1

(12) United States Patent
Lewis

(10) Patent No.: US 8,185,591 B1
(45) Date of Patent: May 22, 2012

(54) SYSTEMS AND METHODS FOR VIEWING EMAIL ATTACHMENTS AS THUMBNAILS

(75) Inventor: Darren Lewis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 970 days.

(21) Appl. No.: 11/241,710

(22) Filed: Sep. 30, 2005

(51) Int. Cl.
*G06F 15/16* (2006.01)
*G06F 19/00* (2011.01)
*G06F 3/048* (2006.01)
*G06F 15/00* (2006.01)
*G06F 17/00* (2006.01)
*H04W 4/00* (2009.01)

(52) U.S. Cl. .......... 709/206; 709/201; 700/97; 715/764; 358/1.15; 455/466; 707/600; 707/705

(58) Field of Classification Search .......... 709/217–229, 709/201–206; 715/764; 707/104.1, 3; 455/466; 700/97; 358/1.15
See application file for complete search history.

(56) References Cited

U.S. PATENT DOCUMENTS

| 5,208,748 | A | 5/1993 | Flores et al. ................ 704/1 |
| 5,216,603 | A | 6/1993 | Flores et al. ................ 704/1 |
| 5,613,108 | A | 3/1997 | Morikawa .................... 393/616 |
| 5,734,837 | A | 3/1998 | Flores et al. ................ 705/7 |
| 5,948,058 | A | 9/1999 | Kudoh et al. ................ 709/206 |
| 6,092,114 | A | 7/2000 | Shaffer et al. ............... 709/232 |
| 6,185,551 | B1 | 2/2001 | Birrell et al. ................ 707/3 |
| 6,188,405 | B1 * | 2/2001 | Czerwinski et al. ......... 715/764 |
| 6,839,741 | B1 | 1/2005 | Tsai ........................... 709/217 |
| 7,028,075 | B2 | 4/2006 | Morris ........................ 709/206 |
| 7,099,860 | B1 * | 8/2006 | Liu et al. ..................... 707/3 |
| 7,809,383 | B2 * | 10/2010 | Rybak et al. ................ 455/466 |
| 2002/0016818 | A1 | 2/2002 | Kirani et al. ................ 709/203 |
| 2002/0059347 | A1 | 5/2002 | Shaffer et al. ............... 707/516 |
| 2002/0059383 | A1 | 5/2002 | Katsuda ....................... 709/206 |
| 2003/0055907 | A1 | 3/2003 | Stiers ........................... 709/206 |

(Continued)

FOREIGN PATENT DOCUMENTS
WO WO 00/23931 4/2000

OTHER PUBLICATIONS

Bellotti, V et al., (2003), "Taking Email to Task: the design and evaluation of a task management centered email tool." In Conference Proceedings on Human Factors in Computing Systems (CHI2003), pp. 345-352, Apr. 5-10, 2003, Fort Lauderdale, Florida. Bellotti, V. et al., "Taskmaster: recasting email as task management," PARC, CSCW '02 Workshop on Redesigning Email for the 21st Century.
Comer, D. and Peterson, L., "Conversation-Based Mail," ACM Transactions on Computer Systems (TOCS) vol. 4, Issue 4, pp. 299-319, Nov. 1986.
Flores, F. et al., "Computer Systems and the design of organizational interaction," ACM Transactions on Information Systems., pp. 153-172, (1988).
Shepherd, A. et al, "Strudel—an extensible electronic conversation toolkit," Proceedings of the 1990 ACM Conference on Computer-supported Cooperative Work, Los Angeles, California, United States, pp. 93-104.

(Continued)

*Primary Examiner* — Ian N Moore
*Assistant Examiner* — Kiet Tang
(74) *Attorney, Agent, or Firm* — Morgan, Lewis & Bockius LLP

(57) ABSTRACT

A method of displaying attachments associated with an electronic message includes, in response to a single user selection of a link to an electronic message, fetching from a document storage system an electronic message and attachment information associated with the electronic message. The attachment information includes one or more images, each image corresponding to at least a predefined portion of a respective attachment associated with the electronic message. The electronic message and the attachment information are displayed in an instance of a client application (e.g., a web browser window). From the images associated with the attachments, a user can have a quick preview of the contents of the attachments without having to download anyone of them.

38 Claims, 18 Drawing Sheets

U.S. PATENT DOCUMENTS

| | | | |
|---|---|---|---|
| 2003/0084106 A1 | 5/2003 | Erev et al. | 709/206 |
| 2003/0101413 A1 | 5/2003 | Klein et al. | 715/513 |
| 2003/0182331 A1 | 9/2003 | Demsky et al. | 707/205 |
| 2003/0208546 A1 | 11/2003 | DeSalvo et al. | 709/206 |
| 2003/0233419 A1 | 12/2003 | Beringer | 709/206 |
| 2003/0234953 A1* | 12/2003 | Dawson et al. | 358/1.15 |
| 2004/0066421 A1 | 4/2004 | Kameyama | 345/864 |
| 2004/0133564 A1 | 7/2004 | Gross et al. | 707/3 |
| 2004/0143564 A1 | 7/2004 | Gross et al. | 707/1 |
| 2004/0143569 A1 | 7/2004 | Gross et al. | 707/3 |
| 2004/0143650 A1 | 7/2004 | Wollowitz | 709/219 |
| 2004/0158340 A1* | 8/2004 | Fischer et al. | 700/97 |
| 2004/0158607 A1* | 8/2004 | Coppinger et al. | 709/206 |
| 2004/0172451 A1* | 9/2004 | Biggs et al. | 709/206 |
| 2004/0210845 A1 | 10/2004 | Paul et al. | 715/731 |
| 2004/0215696 A1* | 10/2004 | Fisher et al. | 709/201 |
| 2005/0144241 A1 | 6/2005 | Stata et al. | 709/206 |
| 2006/0133340 A1 | 6/2006 | Rybak et al. | 370/338 |
| 2006/0136420 A1 | 6/2006 | Gandhi et al. | 707/9 |
| 2006/0167940 A1* | 7/2006 | Colton et al. | 707/104.1 |
| 2007/0091746 A1 | 4/2007 | Brunet et al. | 369/47.12 |
| 2008/0005247 A9* | 1/2008 | Khoo | 709/206 |

OTHER PUBLICATIONS

Venolia, G., et al., "Supporting Email Workflow," Technical Report MSR-TR-2001-88, Microsoft Corporation, 10 pages (Sep. 2001).

Winograd, T., (1987), "A language/action perspective on the design of cooperative work," Human-Computer Interaction, vol. 3 No. 1, pp. 3-30, (1987-1988). Earlier version presented at the Conference on Computer-supported Cooperative Work, Austin, pp. 203-220, Dec. 1986.

Winograd, T., "Where the Action is," pp. 256A-260, Byte, Dec. 1988.

Zawinski, J., "Message Threading," http://www.jwz.org/doc/threading.html, pp. 1-9 (1997-2000).

* cited by examiner

SYSTEMS AND METHODS FOR VIEWING EMAIL ATTACHMENTS AS THUMBNAILS

TECHNICAL FIELD

The disclosed embodiments relate generally to providing information to computer users, and in particular, to allowing computer users to view email attachments as thumbnails using a client application.

BACKGROUND

Web browser-based email services are widely used for communicating information over the Internet. Besides the information in its message body, an email message often includes attachments of various document types. These attachments provide a recipient of the email message additional information in connection with the message body. For a long time, the recipient cannot access any content of an attachment without first downloading the attachment and then launching a native application program to open the attachment. On the other hand, a quick preview of even a slight portion of the content would be crucial for the recipient to determine what is covered by the attachment and whether it is worthwhile to download the attachment at all. Therefore, there is a need for systems and methods that enable email recipients to have a quick grasp of the contents of the email attachments without having to download anyone of them.

SUMMARY OF EMBODIMENTS

According to some embodiments, a method of displaying attachments associated with an electronic message includes, in response to a single user selection of a link to an electronic message, fetching from a document storage system an electronic message and attachment information associated with the electronic message. The attachment information includes one or more images, each image corresponding to at least a predefined portion of a respective attachment associated with the electronic message. The electronic message and the attachment information are displayed in an instance of a client application (e.g., a web browser window). From the images associated with the attachments, a user can have a quick preview of the contents of the attachments without having to download anyone of them.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

DESCRIPTION OF EMBODIMENTS

Figure 1:
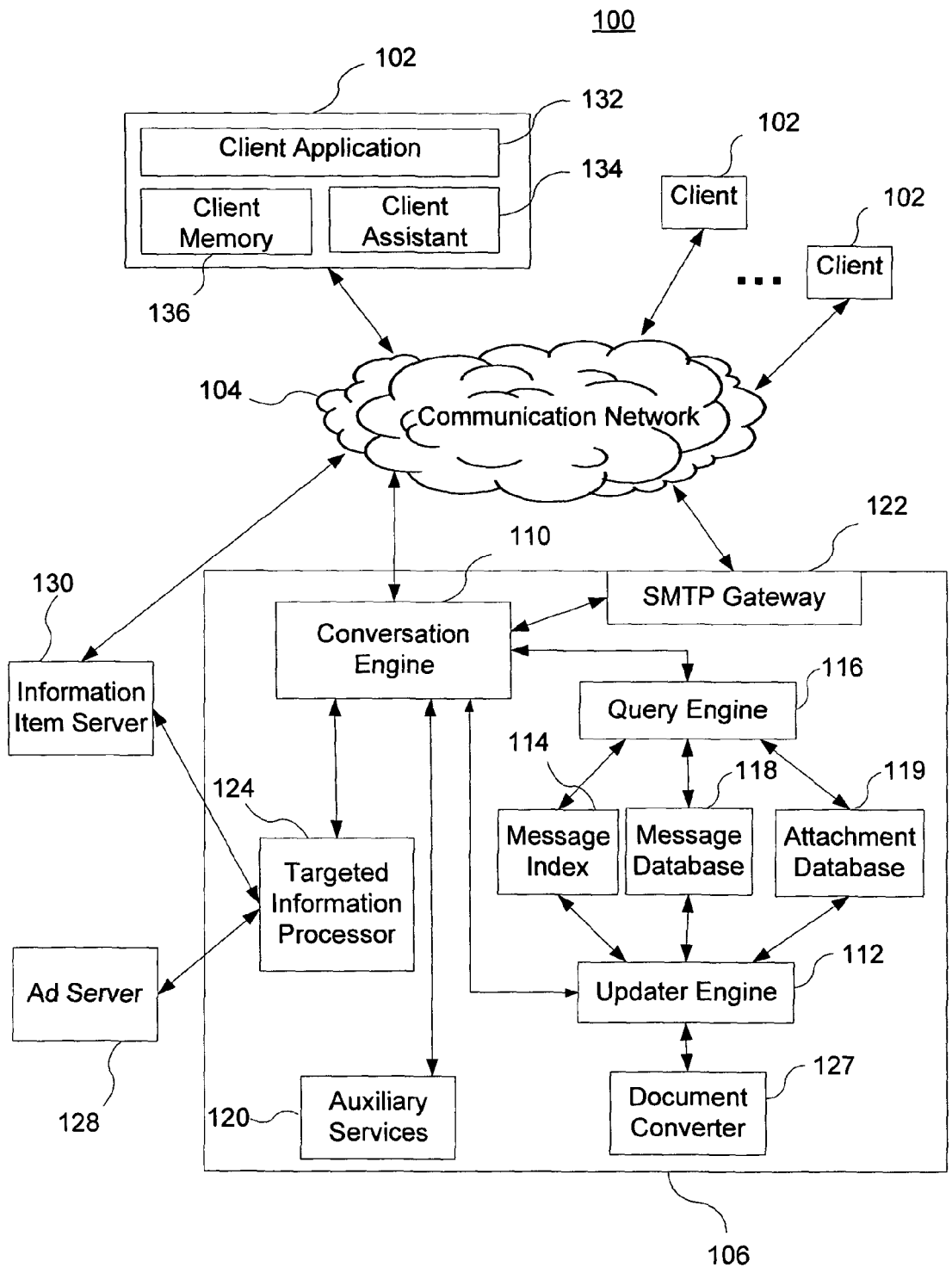
FIG. 1 is a block diagram of an exemplary environment that allows clients to view both email messages and associated attachments in accordance with some embodiments of the present invention.

FIG. 1 is a block diagram of a system 100 for implementing some embodiments of the invention. One or more clients 102 can be connected to a communication network 104. The communication network 104 can be connected to an email service 106. The email service 106 can include a conversation engine 110, an updater engine 112, a message index 114, a query engine 116, a message database 118, a message attachment database 119, a document converter 127, one or more auxiliary services servers 120, an SMTP gateway 122, and a targeted information processor 124. The targeted information processor 124 can be connected to an ad server 128 and/or one or more information item servers 130.

The client 102 can be any of a number of devices (e.g., a computer, an internet kiosk, a personal digital assistant, a cell phone, a gaming device, a desktop computer, or a laptop computer) and can include a client application 132, a client assistant 134, and/or client memory 136. The client application 132 can be a software application that permits a user to interact with the client 102 and/or network resources to perform one or more tasks. For example, the client application 132 can be a browser (e.g., Firefox) or other type of application that permits a user to search for, browse, and/or use resources (e.g., web pages and web services) on the client 102 and/or accessible via the communication network 104. The client assistant 134 can perform one or more tasks related to a user's activities with respect to the client application 132, such as processing information received from or being sent to email service 106. The client assistant 134 can be part of the client application 132, a plug-in to the client application 132 (provided, for example, from various on-line sources), or it may be a stand-alone program. The client assistant 134 can be a web-based messaging application such as the client executable portion of the Google Gmail product. Client memory 136 can store system information, information about a user, as well as files and other data structures.

The communication network 104 may be a wireless, optical, wired or other type of network that facilitates the passage of information. It may include the Internet, one or more local area networks (LANs), one or more wide area networks (WANs), other types of networks, or a combination of such networks.

The term "resource" as used in this document refers to any piece of information or service that is accessible via a Uniform Resource Locator (URL) and can be, for example, a web page, a document, an electronic message, a database, an image, or a computational object. An electronic message includes, but is not limited to, an email message, an Instant Messaging (IM) message, a Short Message Service (SMS) message, and a transcribed voice message. The terms "electronic message", "email message" and "message" are used interchangeably in this document.

The conversation engine 110 can respond to a variety of requests from the client assistant 134 related to messages and return conversation-based responses via its connection with the communication network 104. A conversation may include one or more relevant messages relating to a conversation topic. Various criteria can be used to determine which messages are parts of each distinct conversation. For example, an analysis can be made of the contents of messages received and/or sent by a user. Messages whose contents are found to be related can be grouped together. In another example, a conversation identifier found in a message header can also be used to identify related messages. In a further example, a subject line in the message header can be used to identify related messages. The senders and recipients of the messages are participants in the conversation. All messages directed to a user of the email service 106 can be grouped into a plurality of conversations and presented to the user in a conversation-based format, individually or jointly. In a conversation list view, a user can see in a summary form a list of conversations in which the user participates. In a conversation view, the user can see in an expanded form one or more messages associated with a particular conversation.

The email service 106 can create a snippet of a conversation or a message. A snippet provides a user with a preview of the contents of the conversation or message without the user having to open the conversation or the message. In a list of conversations, the snippet can be generated from the most recent message in the conversation. The snippet can also be extracted from the first message (i.e., the oldest message) in the conversation. The snippet can also be extracted from all the messages in the conversation according to predefined heuristic rules, e.g., listing a set of keywords appearing most frequently in the conversation. If the email service 106 is preparing a list of conversations in response to a search submitted by a user, the email service 106 can create a snippet for each conversation in the list. For each conversation in a displayed portion of the list, the snippet may include a highlighted portion of the conversation that matches user-submitted query terms. These snippets may be similar in one or more respects to snippets included in search results returned by a search engine, such as the Google search engine. In a conversation view, a snippet can be generated for one or more messages in the conversation.

The SMTP gateway 122 is also connected to the communication network 104. The SMTP gateway 122 can be directly involved in receiving and sending messages between the email service 106 and other email systems, messaging systems or email services. In some embodiments, the SMTP gateway 122, for example, transmits and receives messages using the simple mail transfer protocol (SMTP). The SMTP gateway 122 can receive a new message from the communication network 104 and send the message to conversation engine 110 for additional processing. Additionally, the SMTP gateway 122 can receive messages from the conversation engine 110 and then transmit (via the communication network 104) those messages to recipient addresses specified in the headers of the messages.

The one or more auxiliary services servers 120 can provide additional services to the conversation engine 110. The auxiliary services servers 120 can, for example, include a spam detection module for detecting and processing spam and/or an attachment management module for managing the storage and retrieval of documents attached to messages.

As described above, the conversation engine 110 can be connected to the targeted information processor 124. The targeted information processor 124 can provide targeted information for display to a user at client 102. The targeted information processor 124 can provide, for example, advertisements and/or other information items related to the user's messages processed by the conversation engine 110. In some embodiments, the messages include not only messages received by the user but also messages authored and sent by the user. Advertisements are herein defined to include information items, or links to information items, that offer or promote products, services, events, companies, organizations, ideas or the like.

FIG. 1 is exemplary. In some embodiments, the email service 106 contains a subset or superset of those elements illustrated in the figure. Although FIG. 1 shows the email service 106 as a number of discrete elements, this figure is intended more as a functional description of the various features which may be present in the email service 106 than as a structural schematic of the various embodiments. In practice, and as recognized by those of ordinary skill in the art, some elements shown separately could be combined and some elements could be further divided into sub-elements or parallel elements. For example, some separate elements in the figure could be implemented by a single server or module and some single elements could be implemented by one or more servers or modules. The actual number of servers in email service 106 and how features are allocated among the servers will vary from one implementation to another, and may depend in part on the amount of traffic that the system must handle during peak usage periods as well as during average usage periods. For example, the message index 114, the message database 118 and the attachment database 119 can be implemented using a plurality of servers if the email service 106 manages a large volume of messages and attachments associated with a large number of user accounts.

As described above, the client 102 (also herein called the client computer or device) can include client application 132 and client assistant 134. Client application 132 can provide a window to be displayed on a displaying device (e.g., a monitor) for rendering conversations associated with a particular user. The conversations and messages in the conversations can be encoded using HyperText Markup Language (HTML), XML, or any other appropriate markup language or encoding scheme, and then rendered by the client application 132. When a user submits a request through client application 132 to the email service 106 to access messages and attachments stored in the user's account, the email service 106 identifies corresponding conversations in the user's account in accordance with the user's request and transfers them as well as a set of display instructions back to the client 102. Client assistant 134 can, in response, generate one or more forms in accordance with the display instructions, where each form can include information of some of the conversations. The forms can then be submitted to and rendered by client application 132. In another embodiment, client assistant 134 may alternatively exist and operate in the email service 106.

The email service 106 and client assistant 134 work in concert to allow a user to view, compose, send and/or search messages and associated attachments in the user's message account and to present the search results in a highly intuitive fashion. The email service 106 extracts information from a user's message account by processing messages received, sent and/or being composed by the user, and the client assistant 134 assists in rendering the information prepared by the email service 106. In other embodiments a different division of duties between the email service 106 and the client assistant 134 can be implemented. Because many of the tasks performed by the system can be performed by either the email service 106 or the client assistant 134 or by the two working together, these two components are sometimes herein referred to jointly as the "conversation system".

The conversation system can provide at least two different views, including a conversation list view and a conversation view as mentioned briefly above. In a conversation list view, a plurality of conversations can be displayed where each conversation can be displayed in a summary form. For example, each conversation can be represented by a number of conversation elements. The conversation elements can include one or more of: a number indicating the number of messages in the conversation, a list of one or more of the identifiers or names of the senders of messages in the conversation, a conversation description (e.g., a subject line of the message), a date/time value of the conversation (e.g., a date/time value of the last received message in the conversation), and a snippet from one or more of the messages in the conversation. In one approach, each conversation can be represented as a single row in the conversation list view.

In a conversation view, one or more messages from a conversation can be displayed. Each message can be displayed in one of a number of various modes, for example an expanded mode, a compacted mode, or a compressed mode. In an expanded mode, the body of the message can be displayed along with, for example, message header information including names or other identifiers of the sender and the recipients of the message, a date/time value indicative of when the message was received or sent, routing information, and other properties of the message. An expanded mode can be used, for example, for messages which are marked as "unread." In a compacted mode, the message body can be hidden and a snippet from the message is provided in its place. The snippet can be chosen to occupy less space than the body. For example, a snippet can be chosen to occupy only one line in a display window. The compacted mode can be used for messages which have been read or marked as read. The compacted mode allows messages in a conversation to be displayed within the same window more densely than if the expanded mode were used. In a compressed mode, a message can be represented with a small bar. The small bar can contain no message information. The visual effect of such a mode can be that multiple compressed messages appear like the edges of cards in a deck of cards. A user can toggle between the various display modes by selecting a message or using various controls in the display window. It should be understood that the techniques described in this specification with reference to a conversation (as might be found in the Google Gmail product) can be equally used with any message system (e.g., Outlook or Thunderbird) where messages and associated attachments can be displayed in various views (and can include portions of messages) such as a message view or a thread view where related messages can be displayed. For additional information concerning the conversation engine, the conversation list and conversation view modes of operation, see U.S. patent application Ser. No. 10/816,428, filed Mar. 31, 2004, entitled "Displaying Conversations Relevant to a Search Query in a Conversation-Based Email System," which is hereby incorporated by reference.

In some embodiments, when a conversation is being displayed in the conversation view, additional, targeted information (sometimes herein called "informational items") can be displayed in the display window. For example, one or more advertisements relevant to, or related to, one or more of the messages and their associated attachments in the conversation can be displayed. In another example, one or more other types of information can be displayed. Such other information can include, but is not limited to, news items or links to news items, map links, phone numbers, links to product information, stock prices or links to stock prices, links to weather forecasts, web page links, dictionary entries or links to dictionary entries, images or links to images, RSS feeds or links to RSS feeds, links to blog (web log) events, links to user polls, links to files or other content on the client 102, and other types of information.

When an expanded message displayed in a conversation view has one or more attachments, a region in the display window, e.g., the bottom of the message body, is usually reserved for providing information related to the attachments. The attachment information may include a document type icon, a document name, a document size and an attachment downloading link for each attachment. The document type icon suggests the document type of an attachment such as Adobe System's portable document format (PDF) or Microsoft Corporation's PowerPoint (PPT). Sometimes, the document type icon may shed some light on the content of the attachment. For example, a PPT document type icon suggests that the attachment is probably a PowerPoint presentation.

The document type icon may also suggest to the user the native application program required to open the downloaded attachment. The document size, together with the network's data transmission rate, determines the attachment downloading time, i.e., how long it takes to download an attachment from the email service 106 to the client 102.

As described above, the email attachments may include additional information related to the message body. In some cases, however, the message body may provide little or no information while an attachment to the same email message may contain substantially more information than the message body. In such cases, the message body itself provides little, if any, clue that can be relied upon to identify targeted information. But the attachment may provide more information that would be useful for identifying targeted information to be displayed along with the message.

Figure 2A:
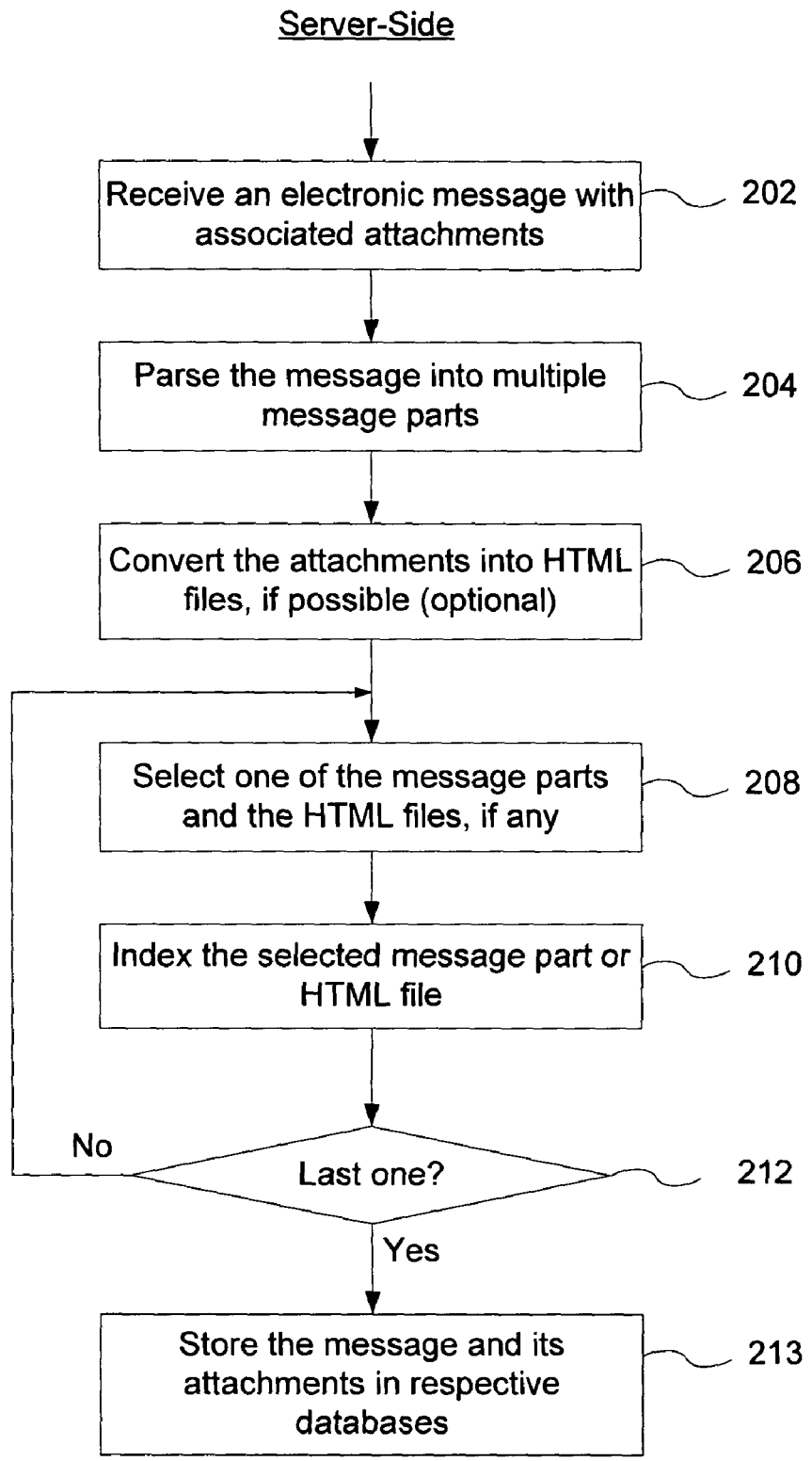
FIG. 2A is a flow diagram of a process of parsing and indexing an incoming electronic message and its associated attachments in accordance with some embodiments of the present invention.
Figure 2B:
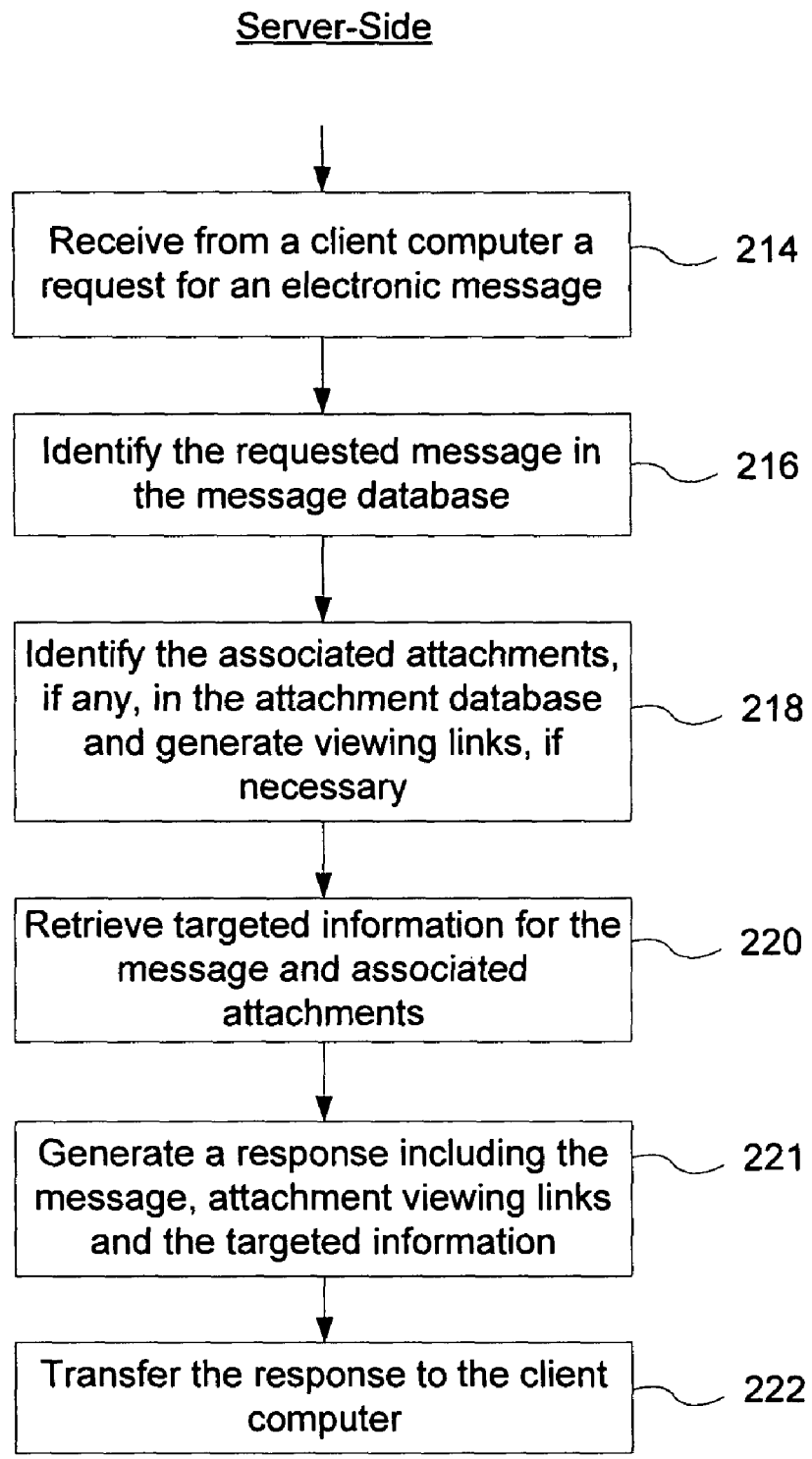
FIG. 2B is a flow diagram of a process of identifying an electronic message and preparing a corresponding response upon receipt of a client request for the electronic message in accordance with some embodiments of the present invention.

FIG. 2A is a flow diagram of a process of parsing and indexing an incoming electronic message and its associated attachments in accordance with some embodiments of the present invention. After receiving an incoming message having one or more attachments (202), the email service 106 parses the message into multiple message parts (204). For example, the message may be divided into a message header, a message body and one or more attachments. If the message has any attachments that the document converter 127 is capable of converting into an HTML file, the document converter 127 converts the content of those attachments into HTML files (206). Alternately, the document converter 127 may convert the files into XML files, or files encoded using any other suitable markup language. For ease of explanation, we will assume that the markup language used by the document converter 127 is HTML.

Some message attachments are not converted by the document converter 127. In some embodiments, these attachments that are not converted include image attachments, attachments whose document type is unknown or not recognized by the email server, attachments that can viewed using a conventional web browser without conversion, and attachments for which the document converter 127 does not have a conversion program or process. In some embodiments, the set of documents that are not converted at 206 furthermore includes any documents that the email system's indexer (which forms part of the updater engine 112) is capable of parsing and indexing in its native format. For instance, if the email system's indexer can parse and index files used by a particular word processing program, those files are not converted to HTML at 206.

In practice, the email system 106 stores or accesses a first list of file types (which may include data types as well) of attachments that are to be converted into HTML files by the document converter 127 at 206. Any attachment whose file or data type is not found on the first list is not converted by the document converter 127. In some embodiments, the email system also stores (or has access to) a second list of file types (which may include data types as well) of attachments that the document converter 127 is capable of converting into HTML files. The second list of file types may include one or more file types that are not included in the first list. For example, the second list of file types may include a file type associated with files that the indexer (in updater engine 112) is capable of parsing and indexing in their native format. While the first and second lists of file types may be the same in some embodiments, in other embodiments the second list contains more file types than the first list. In some embodiments, the first and second file lists are stored in a single data structure, along with information (e.g., a flag value) to indicate which of the listed file types belong to the first list, and which do not.

Next, the email service 106 selects a message part, or its corresponding converted HTML file (208), and indexes the selected message part or HTML file (210). The indexing result is stored in the message index 114. The selecting and indexing operations are repeated until all parts of the message have been processed. In addition, the email service 106 stores the message in the message database 118 and the attachments in the attachment database 119 (213). In some embodiments, the converted HTML files are also stored in a database for future use. However, in some other embodiments, the email service 106 discards the converted HTML files after indexing them at 210. In this case, an attachment requested by a client will be converted into an HTML file on the fly, as described below.

In some embodiments, document conversion operation 206 is performed as part of the message part processing loop 208-210. In particular, as each message part is selected (208), if the message part is an attachment whose file or data type is a member of the aforementioned list of file types to be converted, the attachment is converted into an HTML (or other markup language) file prior to performing the indexing operation 210. If the message part is an attachment whose file or data type does not match the list of file types to be converted, the message part is indexed only if the indexer is capable of parsing and indexing message part in its native format. For some attachment types, the indexer may index only the file name, or the file name and predefined types of metadata (e.g., image titles).

The message parsing and indexing process shown in FIG. 2 occurs when the email service 106 receives a new incoming message directed to the user. When a user submits a message accessing request, the email service 106 identifies the requested message and prepares a response to the requesting user. FIG. 2B is a flow diagram of a process of identifying an electronic message and preparing a corresponding response upon receipt of a client request for the electronic message in accordance with some embodiments of the present invention.

Initially, the email service 106 receives from a client computer a request for a message (214). The email service 106 identifies the requested message in the message database 118 (216). In some embodiments, the identified message has an attachment identifier for each associated attachment. The email service 106 then identifies the associated attachments in the attachment database 119 using the attachment identifiers (218). For each attachment, the email service 106 determines if the attachment has a file type that can be converted into an HTML file by the document converter 127. In some embodiments, this determination is made by determining if the attachment's file type matches (e.g., is found in) the aforementioned second list of file types. If an attachment has a file type that can be converted by the document converter, the email service generates an attachment viewing link for the corresponding attachment. The attachment viewing link, if selected or otherwise activated by the user, causes a converted version of the attachment to be downloaded to the user's client device for viewing in a browser window or instance. Furthermore, the user is able to obtain a "quick view" of the associated attachment without downloading the attachment in its native format. More information about this process is provided below in connection with FIGS. 2C and 2D. As noted above, in some embodiments, the email system 106 or the document converter 127 includes a predefined set of HTML-convertible document types (e.g., in the form of file extensions). This predefined set of HTML-convertible document types may be stored in the form of a list or other data structure. If a respective attachment does not have a matching file extension, the email service 106 does not generate an attachment viewing link for the attachment.

Since the identified message and its associated attachments have been parsed and indexed previously (FIG. 2A), the email service 106 can invoke the targeted information processor 124 to retrieve targeted information from information item server 130 and ad server 128 (220). For example, if one of the attachments to a message includes a package shipment tracking number, the targeted information processor 124 may retrieve information about the current shipment status from an information item server. Next, the email service 106 generates a response to the client request (221). This response includes the requested message, links for downloading each of the message's attachments, attachment viewing links for each of the HTML-convertible attachments (if any), and targeted information items (if any were identified at 220). The response is then transferred to the requesting client computer (222).

Figure 2C:
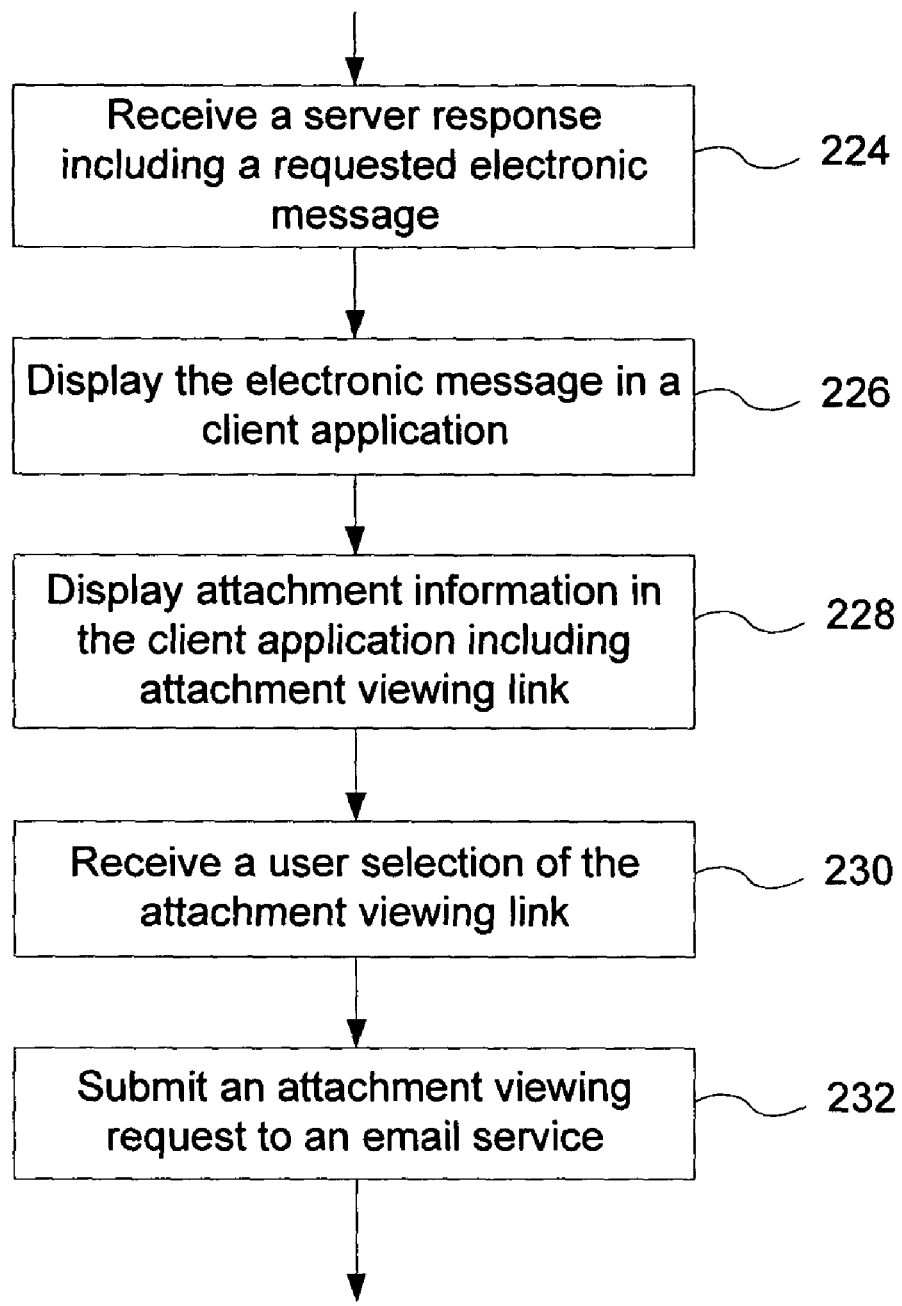
FIG. 2C is a flow diagram of a process of displaying an electronic message including its associated attachment viewing links to a client user and capturing the user's subsequent requests in accordance with some embodiments of the present invention.

FIG. 2C is a flow diagram of a process at a client computer after receiving a server response from the email service 106 in accordance with some embodiments of the present invention. Upon receipt of the server response (224), the client computer displays the requested message in a client application 132 (e.g., a web browser) to allow the user to view the message (226). Depending on whether the message has any attachments, the client application 132 may also display attachment information (228). In some embodiments, the attachment information includes a document name (sometimes called the attachment name) and an attachment downloading link for each attachment. As described above, in some embodiments the attachment information also includes a document type icon and a document size for each attachment, in addition to the document name and attachment downloading link. An attachment viewing link may be displayed next to the attachment downloading link if the attachment was deemed to be HTML-convertible by the email service 106.

Upon receiving or viewing the message, the user may want to view the content of an attachment without downloading the attachment itself. For example, if the client computer does not have an installed application program corresponding to the file type of the attachment, the user may be unable to open the attachment for viewing after downloading it to the client computer. In certain cases, the user may be only interested in the textual portion of an attachment, and therefore may not need the attachment to be rendered by an application program corresponding to the attachment's file type. Using a PowerPoint (trademark of Microsoft) presentation file as an example of an attachment, the user may be only interested in determining the topic discussed in the attachment, and therefore may not need to see a full rendering of presentation. Regardless of the user's reason for wanting to view an attachment without opening it using a corresponding application program, the attachment viewing link provides an easy, convenient alternative to downloading the attachment and opening it using an application program. The user can simply select an attachment viewing link to view an HTML version of the attachment. In response to the user selection (230), the client application 132 or the client assistant 134 submits an attachment viewing request to the email service 106 (232).

Figure 2D:
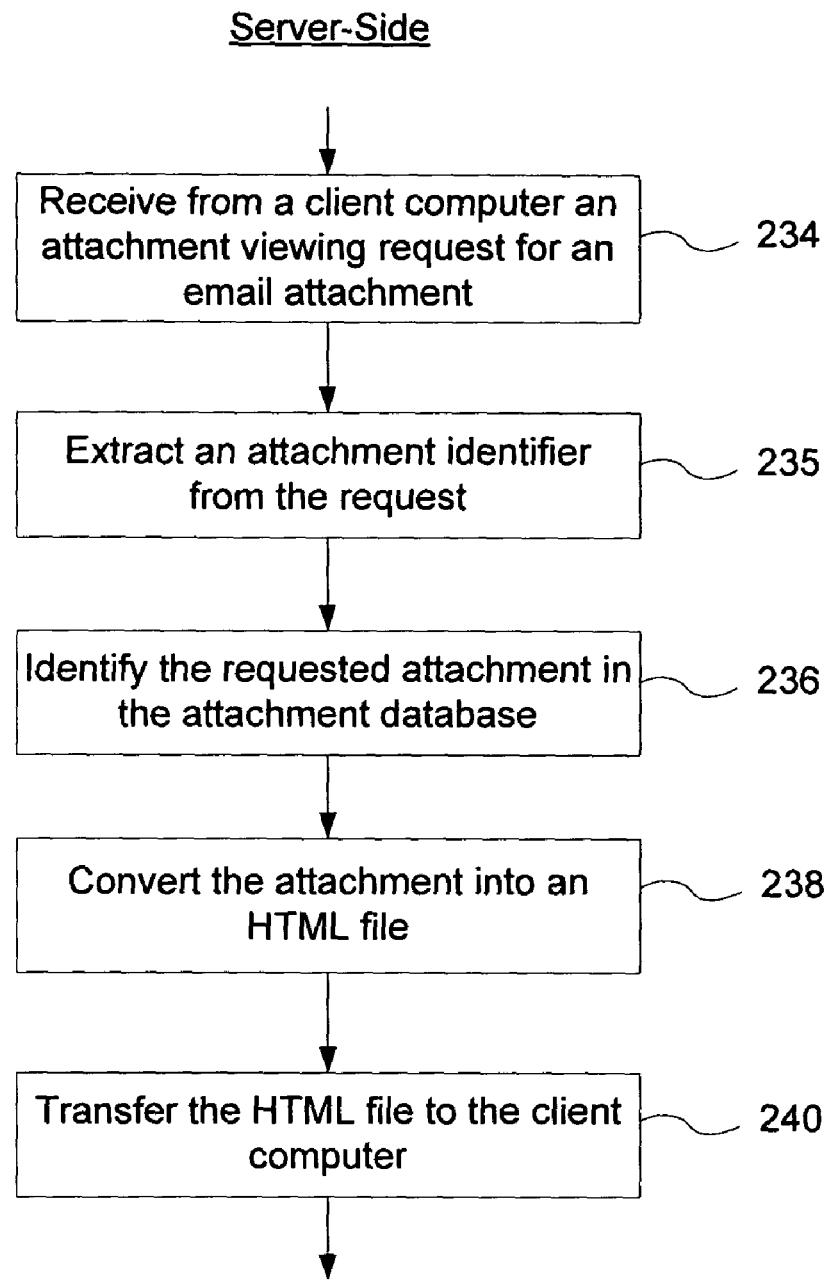
FIG. 2D is a flow diagram of a process of converting a client-specified attachment into an HTML file and serving the HTML file to the requesting client in accordance with some embodiments of the present invention.

FIG. 2D is a flow diagram of a process, performed by the email service 106, in response to receiving an attachment viewing request in accordance with some embodiments of the present invention. From the attachment viewing request (234), the email service 106 extracts an attachment identifier (235). Using the attachment identifier, the email service 106 identifies the requested attachment in the attachment database 119 (236). The requested attachment is then submitted to the document converter 127 to be converted into an HTML file (238). The email service 106 then transfers the HTML file back to the client computer as a response to the attachment viewing request (240).

However, if the file was previously converted into an HTML file at 206 (FIG. 2A), and the previously-generated HTML file has been saved by the email service 106, operation 238 is replaced by retrieval of the previously-generated HTML file, thereby allowing the request to be processed more quickly than if the attachment is converted into an HTML file in response to the request. This speed up in response requires additional storage space in the email service 106 for storing the previously-generated HTML files. In some embodiments, the email service 106 may adopt a hybrid approach by saving only the HTML files of those attachments that have met predetermined criteria, e.g., attachments whose senders are in a predefined list, or attachments having one of a predefined set of document types, or the attachments of messages received by the email service less than M days or hours ago, where M is a predefined value. In the latter example, HTML files produced by converting the attachments of received messages are initially stored by the email server 106, and are then deleted when the age of the message, as measured from the time of receipt of the message, exceeds a predefined threshold.

The operation on the client side is relatively straightforward. Following a user selection of the attachment viewing link, a corresponding request is sent by the client device to the email service 106. When the response to the request is received, the response includes an HTML file or document. The client device opens a new instance of the client application (e.g., a new web browser window) and renders the received HTML file or document (i.e., the HTML-converted attachment) in the new instance of the client application.

Besides reading new messages, a user often searches old messages in his or her user account for information of interest. Parsing and indexing message attachments, thereby making the content of the attachments available for searching, greatly expands the utility of user searches for information of interest. In some embodiments, a user can limit the search range for a particular search to include message attachments, but to exclude message bodies. In some embodiments, a user can limit the search range for a particular search to include message bodies, but to exclude message attachments. In some embodiments, a user can set the search range for a particular search to include both message bodies and message attachments.

Figure 3A:
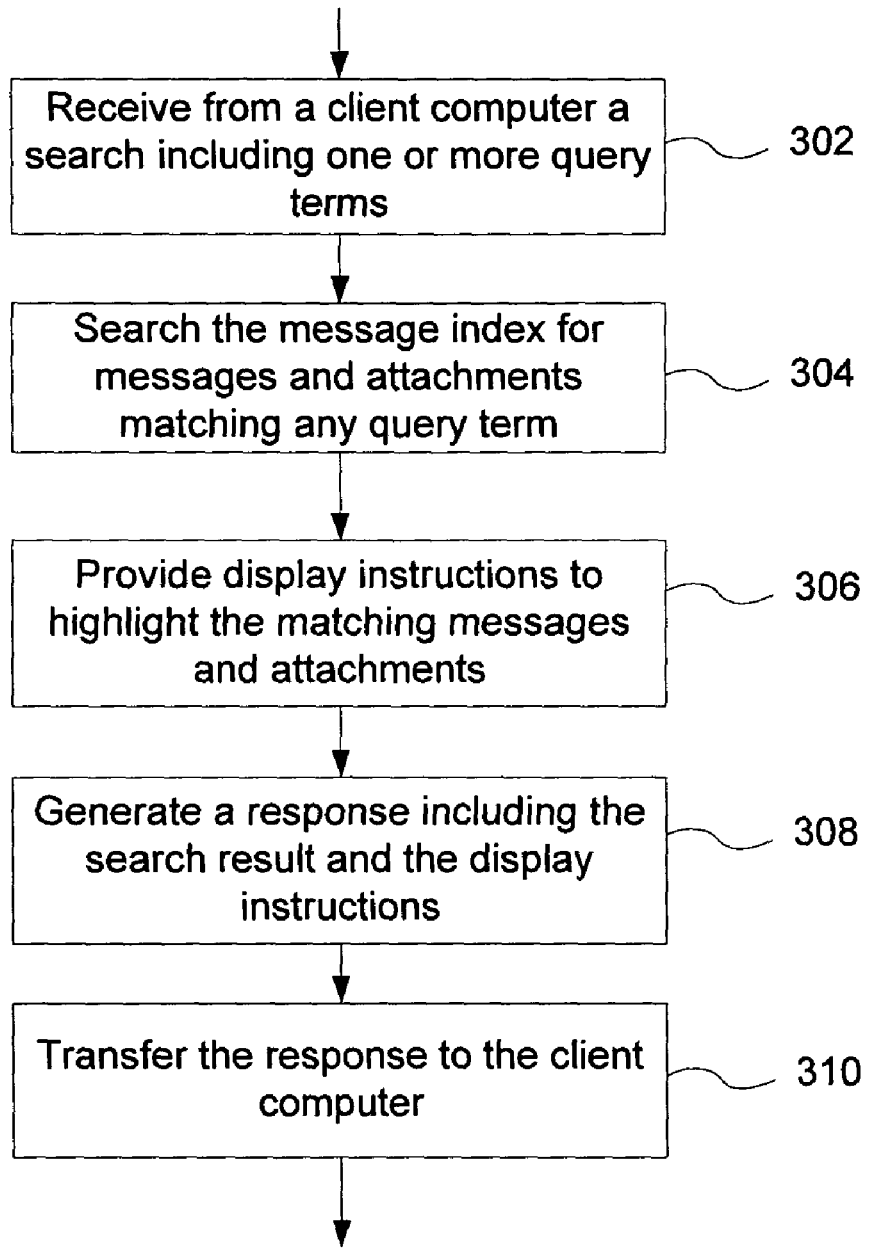
FIG. 3A is a flow diagram of a process of identifying matching messages including attachments and preparing a corresponding response upon receipt of a search from a client in accordance with some embodiments of the present invention.
Figure 3B:
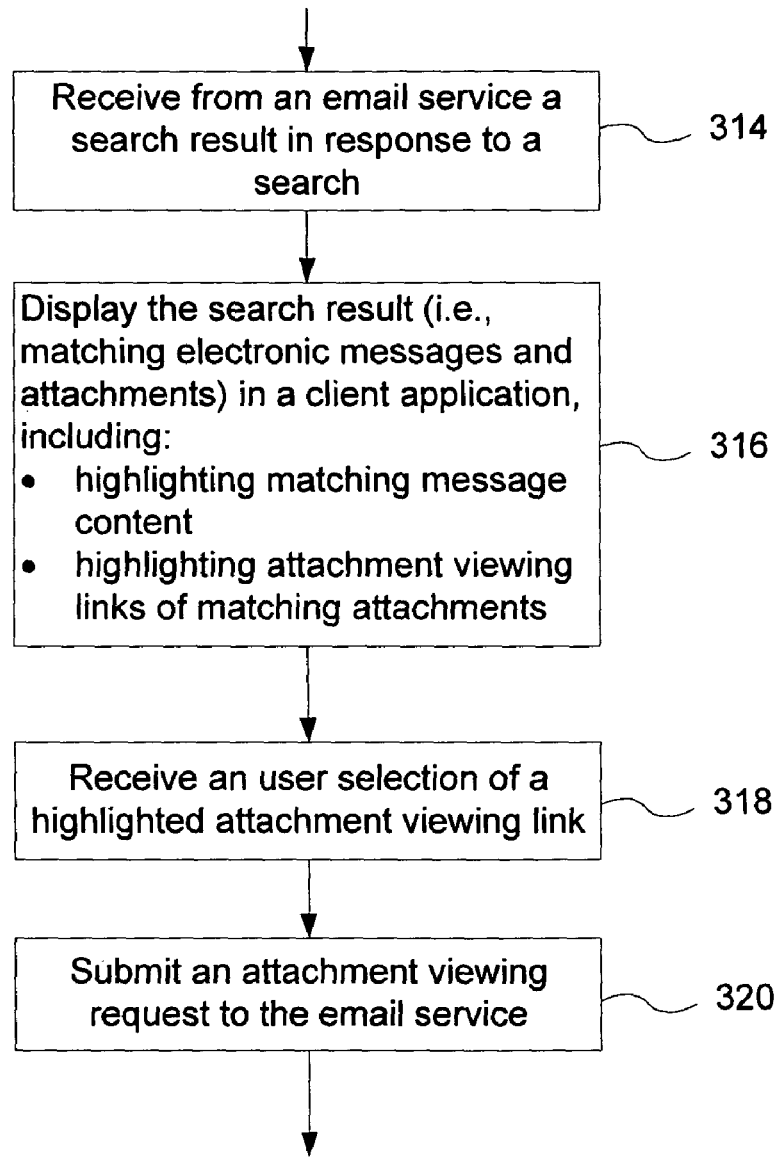
FIG. 3B is a flow diagram of a process of displaying electronic messages matching a search and capturing the user's subsequent requests in accordance with some embodiments of the present invention.
Figure 3C:
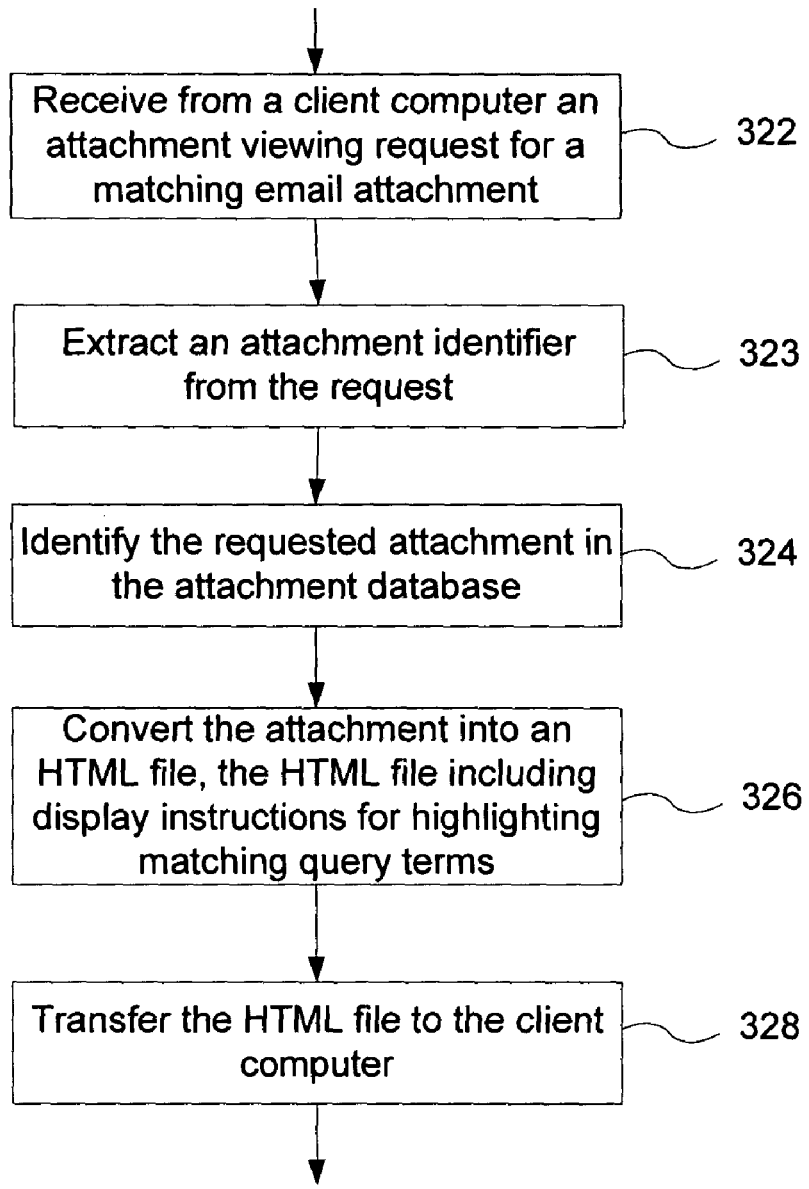
FIG. 3C is a flow diagram of a process of converting a client-specified attachment into an HTML file in a predefined manner and serving the HTML file to the requesting client in accordance with some embodiments of the present invention.

FIGS. 3A-3C depict the processes of searching and displaying both message bodies and attachments for information matching a query term. FIG. 3A is a flow diagram of a process of identifying matching messages, including messages having attachments that match a search query, and preparing a response upon receipt of a search from a client in accordance with some embodiments of the present invention. Initially, the email service 106 receives from a client computer a search query including one or more query terms (302). Using the query terms, the email service 106 searches its message index 114 for messages and associated attachments that match any of the query terms (304). The search result may comprise three types of messages: (i) messages whose message body includes matching content (i.e., content that satisfies the search query, for example by matching one or more of the query terms); (ii) messages whose attachment(s) includes matching content; and (iii) messages whose message body and one or more attachments both include matching content (e.g., content in the message body matches or corresponds to at least one portion of a search query while content in an attachment matches or corresponds to at least another portion of the search query).

Next, the email service 106 provides display instructions to highlight the matching content in the identified messages and/or attachments (306). A search result including a single message or multiple messages associated with a single conversation is to be displayed in a conversation view. The matching content in the message body may be highlighted (i.e., formatted for display in a visually distinctive manner, compared to other content in the message body). For example, the matching content in the message body may be formatted for display using boldface characters and a distinctive background color. Note that there are many other highlighting schemes that can be employed to make the matching content look more prominent. In some embodiments, if the matching content is found in an attachment associated with a message, the corresponding document name of the attachment is highlighted. Optionally, the attachment viewing link of the attachment may also be highlighted. Highlighting an attachment's document name and/or attachment viewing link effectively notifies the user that the attachment contains content matching the query used to identify the message.

A search result including multiple messages associated with more than one conversation is displayed in a conversation list view. Each conversation may have a snippet. The snippet may include highlighted matching content in the message body. If the matching content is found in the attachment, the snippet may include the highlighted attachment document name, the highlighted attachment viewing link, highlighted matching content in the attachment, or a combination of two or more of these. After the user clicks on one of the conversations, the conversation list view will be replaced by a conversation view including the highlighted matching content as described above.

At the end, the email service 106 generates a response including the search result and the associated display instructions (308) and transfers the response to the requesting client computer for display (310).

FIG. 3B is a flow diagram illustrating a process of displaying the search result in a predefined manner on a client computer or device and capturing the user's subsequent requests in accordance with some embodiments of the present invention. Upon receipt of a search result (314), the client computer displays it in a client application (e.g., a web browser) in accordance with the display instructions accompanying the search result (316). The search result includes information from one or more matching messages, which are messages that match a search query. For purposes of this discussion, "matching messages" may include messages having one or more attachments that match a search query. As noted above, the display instructions accompanying the search result may include instructions for highlighting message content matching the search query. The display instructions may also include instructions for highlighting the document name and/or attachment viewing link of any message attachments that match the search query. The matching messages may be displayed in a conversation list view or a conversation view depending on the number of unique conversations in the search result. If the user is interested in viewing an attachment of a message, the user may click on the highlighted attachment viewing link (318). In response, the client application 132 or the client assistant 134 submits an attachment viewing request to the email service 106 (320).

FIG. 3C is a flow diagram of a process at the email service 106 of converting a client-specified attachment into an HTML file in a predefined manner and then serving the HTML file to the requesting client in accordance with some embodiments of the present invention. From the attachment viewing request (322), the email service 106 extracts an attachment identifier (323). Using the attachment identifier, the email service 106 identifies the matching attachment in the attachment database 119 (324). The attachment and the matching query term(s) are then sent to the document converter 127. The document converter 127 converts the attachment into an HTML file (326), herein called the "converted HTML file." The converted HTML file includes (or is modified to include) display instructions to highlight the matching query term(s). The converted HTML file is then sent back to the client computer for display (328).

Figure 4A:
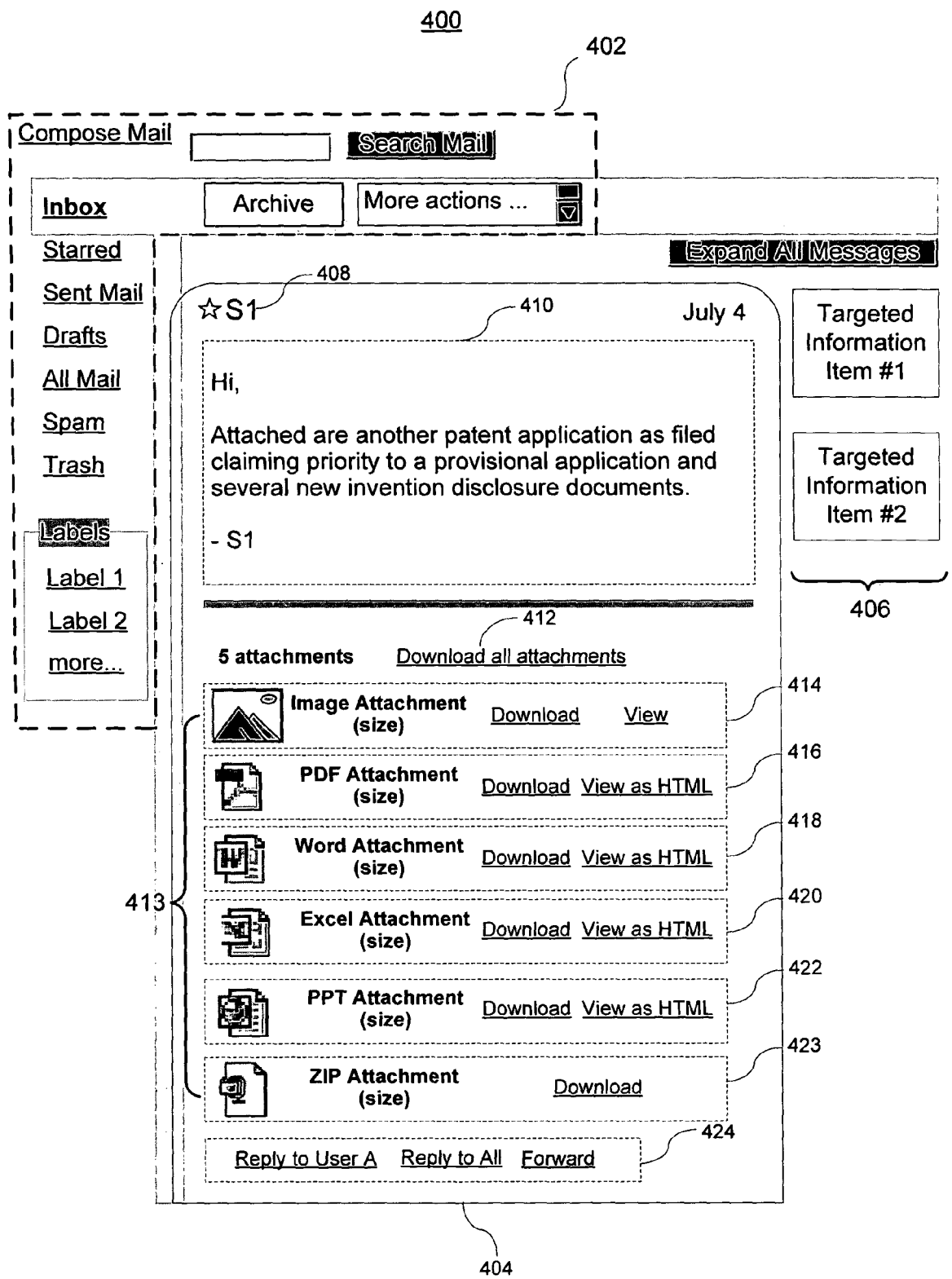
FIG. 4A illustrates an exemplary schematic screenshot of an electronic message in a client application including multiple attachment viewing links in accordance with some embodiments of the present invention.
Figure 4B:
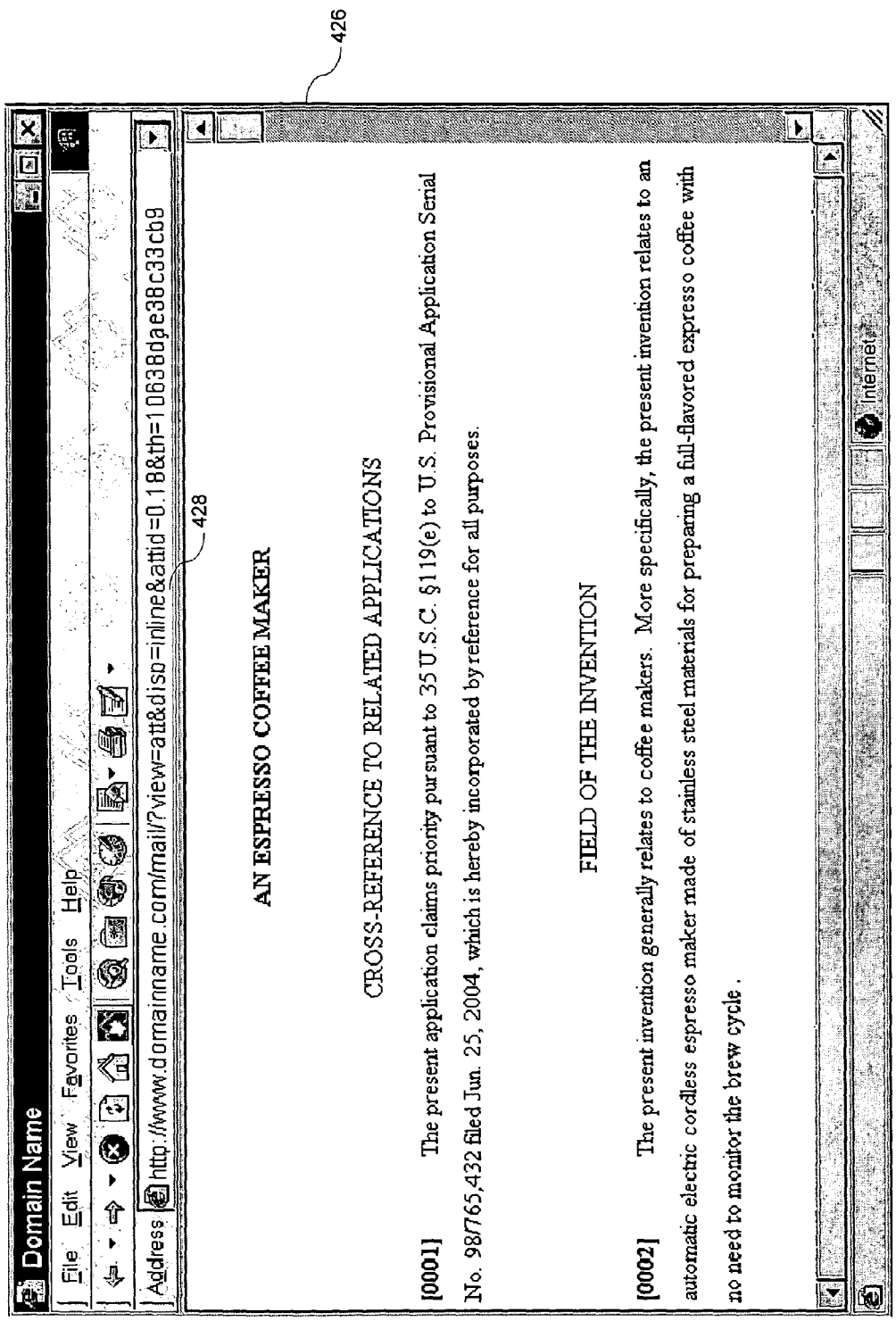
FIG. 4B illustrates an exemplary schematic screenshot of a portable document format (PDF) file viewed as an HTML file in a web browser window in accordance with some embodiments of the present invention.

To better illustrate the present invention, FIGS. 4A and 4B are two exemplary schematic screenshots illustrating how the attachments are viewed as HTML files on a client computer.

FIG. 4A provides an exemplary, schematic screenshot of a display with a conversation, a message body including attachment information and targeted information items in accordance with some embodiments of the invention. FIG. 4A provides one exemplary display organization for illustrative purposes only and does not serve to limit the ways that conversations, attachment information and targeted information items can be displayed. The display area 400 includes three major display portions: a navigation and control portion 402, a message portion 404, and a targeted information item portion 406. The navigation and control portion 402 can include one or more navigation and/or control items (e.g., "Compose Mail" and "Search Mail", etc.). The targeted information item portion 406 can include one or more information items which have been obtained by the targeted information processor 124. FIG. 4A illustrates only one exemplary layout configuration and other layouts are possible. For example, the relative position of the display areas to each other may change (e.g., the targeted information item portion 406 can be displayed to the left, right, above or below the message portion 404).

The message portion 404 may include a conversation description and one or more messages associated with a conversation. The conversation view in FIG. 4A includes only one message. The message was sent by sender "S1" 408 to the user. The message body 410 indicates that the message has a set of attachments.

The attachment information is placed in the message portion 404, below the message body 410. The attachment information includes a "Download all attachments" link 412. The user can click on this link to download all the attachments associated with this message to a user-specified location on the client computer, e.g., in the form of a ZIP file. A six row table 413 contains attachment information associated with individual attachments. Row 414 corresponds to an image attachment. The user can click on one of the two links in this row to either download the image or view the image directly from a web browser window or a plug-in application program. Rows 416, 418, 420 and 422 correspond to attachments having different document types such as PDF, Word, Excel and PowerPoint (Word, Excel, and PowerPoint are trademarks of Microsoft). Each row includes a "View as HTML" link. When a user clicks on the view attachment link in a particular row, a new web browser window pops up displaying the corresponding attachment's content in the HTML format.

It should be noted that, when an attachment is displayed in a web browser window, the HTML-format display style may or may not be the same as that when the attachment is displayed by a native application program. A Word attachment or a PDF text attachment rendered in the web browser window may look substantially similar to the corresponding document rendered by Microsoft's Office or Adobe System's Acrobat. But a PowerPoint attachment rendered in the web browser window may look substantially dissimilar to the corresponding document rendered by Microsoft's Office, for instance because animations in the PowerPoint attachment are not replicated in the converted HTML document. In some embodiments, the converted HTML file includes only text extracted from the PowerPoint attachment and does not include any of the graphics, animations or templates of the attachment. This may apply to other types of files as well, such as other types of presentation files and motion picture files.

FIG. 4A shows that not all attachments have an associated "View as HTML" link. For example, the ZIP attachment 423 has a download link, but does not have a view link and does not have a "View as HTML" link. There are both practical and technical reasons behind this configuration. First, a ZIP file often includes multiple documents, and a primary purpose of attaching a ZIP file to a message is to allow the recipient of the message to efficiently download the multiple documents. Second, the multiple documents within a ZIP file may have different document types, some of which the document converter may not be able to convert into HTML files. In any case, converting multiple documents into a single HTML document may not make sense in many situations. Third, a ZIP file is sometimes very large, making conversion of the ZIP file expensive and lengthy.

Assuming that the user clicks on the "View as HTML" link in row 416, FIG. 4B illustrates an exemplary schematic screenshot of the PDF file viewed as an HTML file in a web browser window 426 in accordance with some embodiments of the present invention. The address field 428 of the web browser window 426 includes an exemplary attachment viewing request submitted from a client. The request includes multiple pairs of parameters and values. For example, the value of the parameter "view" is "att", indicating that the file to be viewed is an attachment. The value of the parameter "disp" is "inline", indicating that the attachment is to be displayed in a separate web browser window. One skilled in the art will find that the attachment viewing request in FIG. 4B is only for illustrative purposes. There are many other HTTP-based schemes that can achieve the same or similar result. If the user clicks on the "View as HTML" link in row 422, another web browser window may pop up displaying the HTML version of the corresponding PowerPoint presentation attachment. Unlike Microsoft Office, which renders a PPT document slide by slide, the web browser window includes the textual portion of the presentation. When the converted HTML file is too long to be viewed all at once in a browser window, the user may use the browser window's scroll bar to view the entire converted HTML file.

Figure 5A:
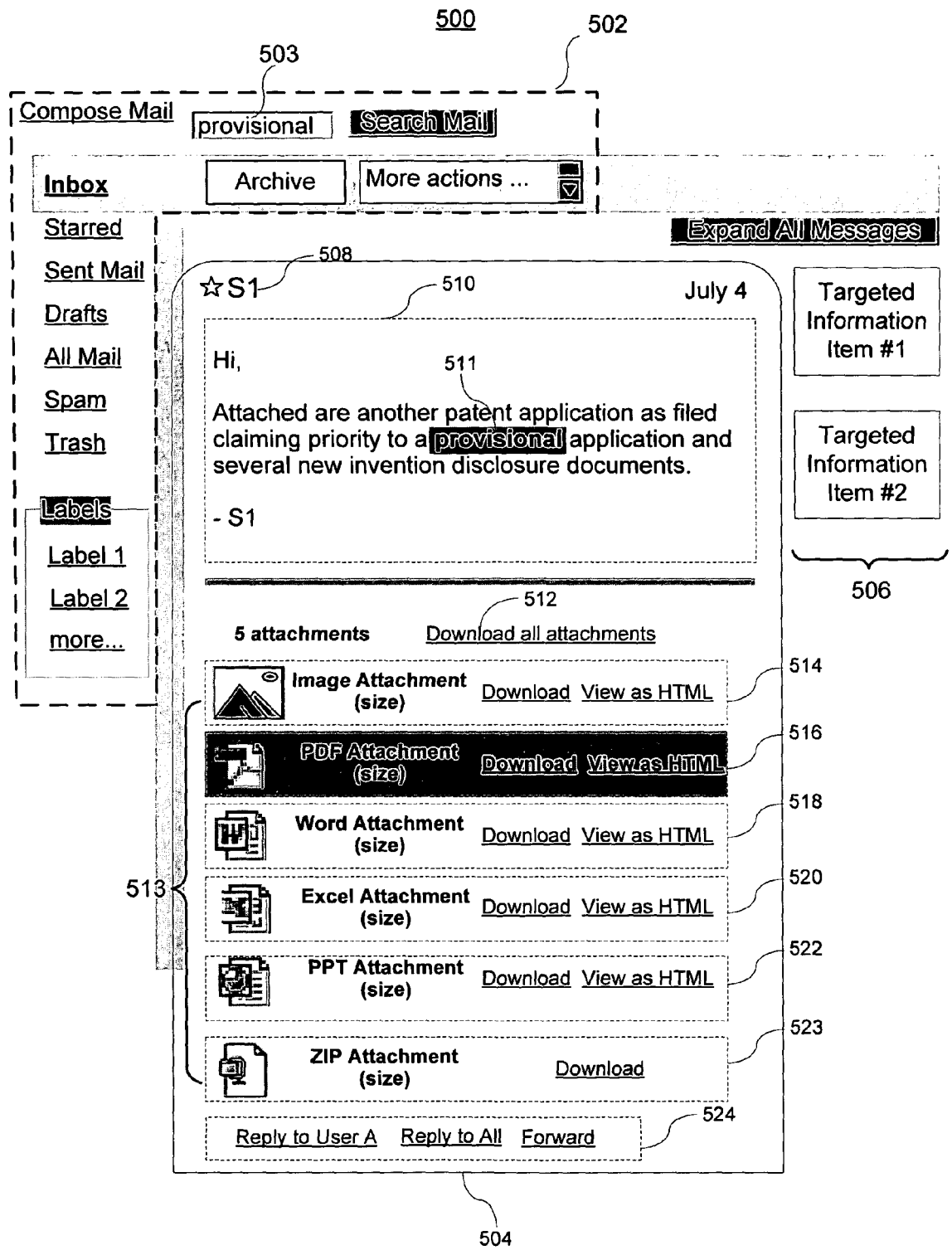
FIG. 5A illustrates an exemplary schematic screenshot of an electronic message in a client application including highlighted items matching a search in accordance with some embodiments of the present invention.
Figure 5B:
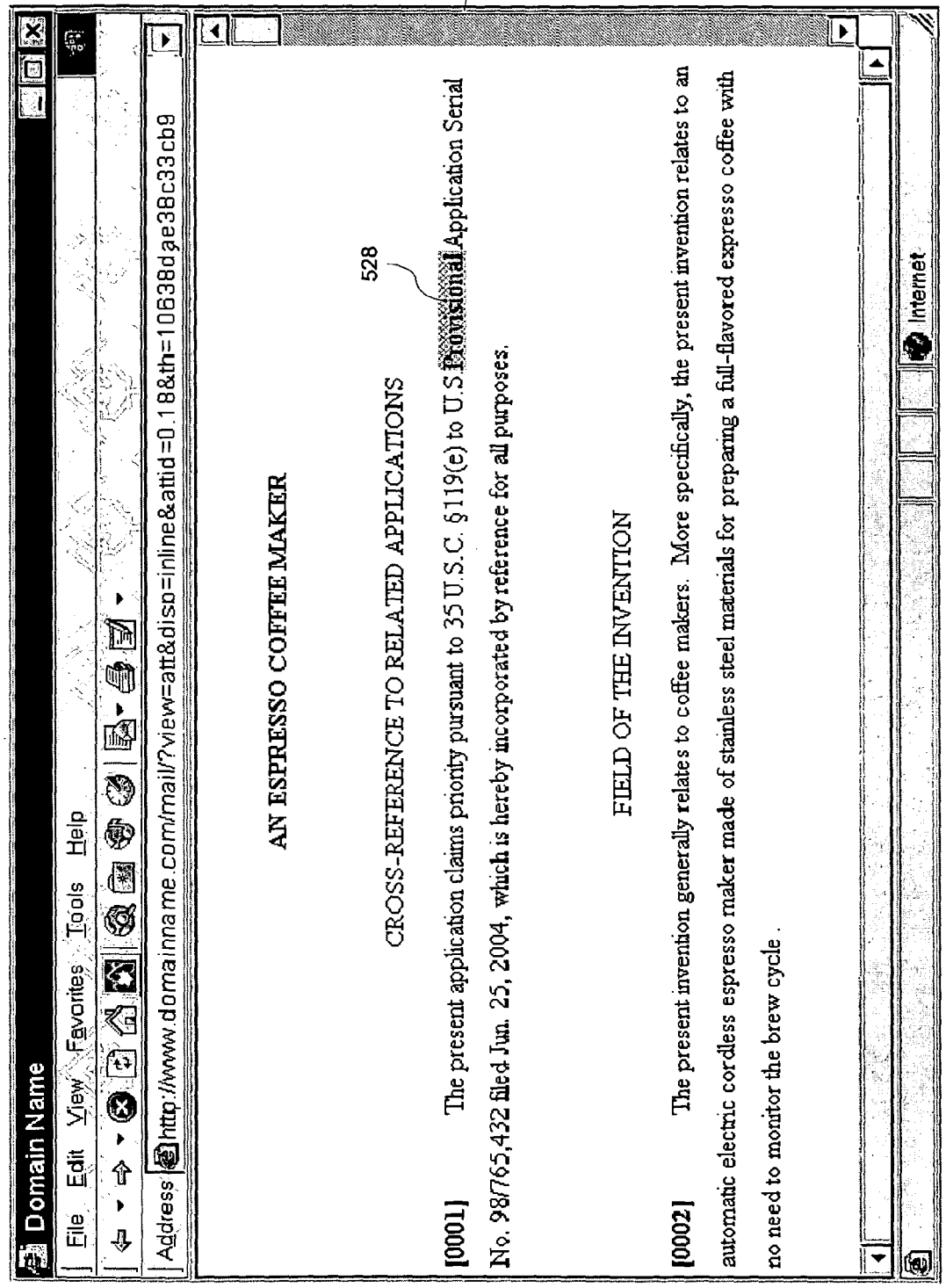
FIG. 5B illustrates an exemplary schematic screenshot of a PDF file viewed as an HTML file in a web browser window including highlighted items matching a search in accordance with some embodiments of the present invention.

FIG. 5A is similar to FIG. 4A except that it highlights all instances of a query term in the message body and the attachment information. In this example, the query term is "provisional" and there are two copies of the term "provisional" in the display area 500, one copy 511 in the message body 510 and the other copy in the PDF attachment in row 516. The term "provisional" in the message body 510 is highlighted, by use of a boldface font and a distinct background color. All text in the row 516 is highlighted, by use of a boldface font, and the entire region corresponding to the row 516 has a distinct background color. When the user clicks on the "View as HTML" link in row 516, an HTML converted version of the attachment identified by row 516 is displayed in a new browser window, as shown in FIG. 5B. FIG. 5B is similar to FIG. 4B, except that the instance of the query term "provisional" 528 in the message body has been highlighted.

Figure 6:
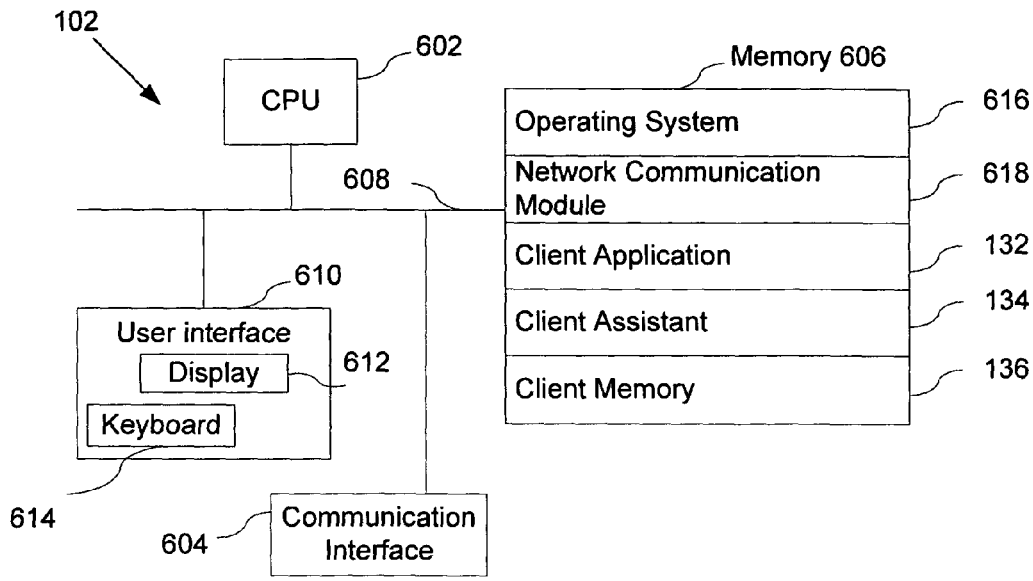
FIG. 6 is a block diagram of an exemplary client in accordance with some embodiments of the present invention.

FIG. 6 is a block diagram of an exemplary client in accordance with some embodiments of the present invention. The client 102 typically includes one or more processing units (CPUs) 602, one or more network or other communications interfaces 604, memory 606, and one or more communication buses 608 for interconnecting these components. The client 102 optionally may include a user interface 610 comprising a display device 612 and a keyboard 614. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. In some embodiments, memory 606 stores the following programs, modules and data structures, or a subset thereof:

- an operating system 616 that includes procedures for handling various basic system services and for performing hardware dependent tasks;
- a network communication module 618 that is used for connecting the client 102 to other computers via the one or more communication network interfaces 604 and one or more communication networks, such as the Internet, other wide area networks, local area networks, metropolitan area networks, and so on;
- a client application 132, such as a web browser, that enables a user to view messages and message attachments, as described above; and
- a client assistant 134 that can perform one or more tasks as described above.

Figure 7:
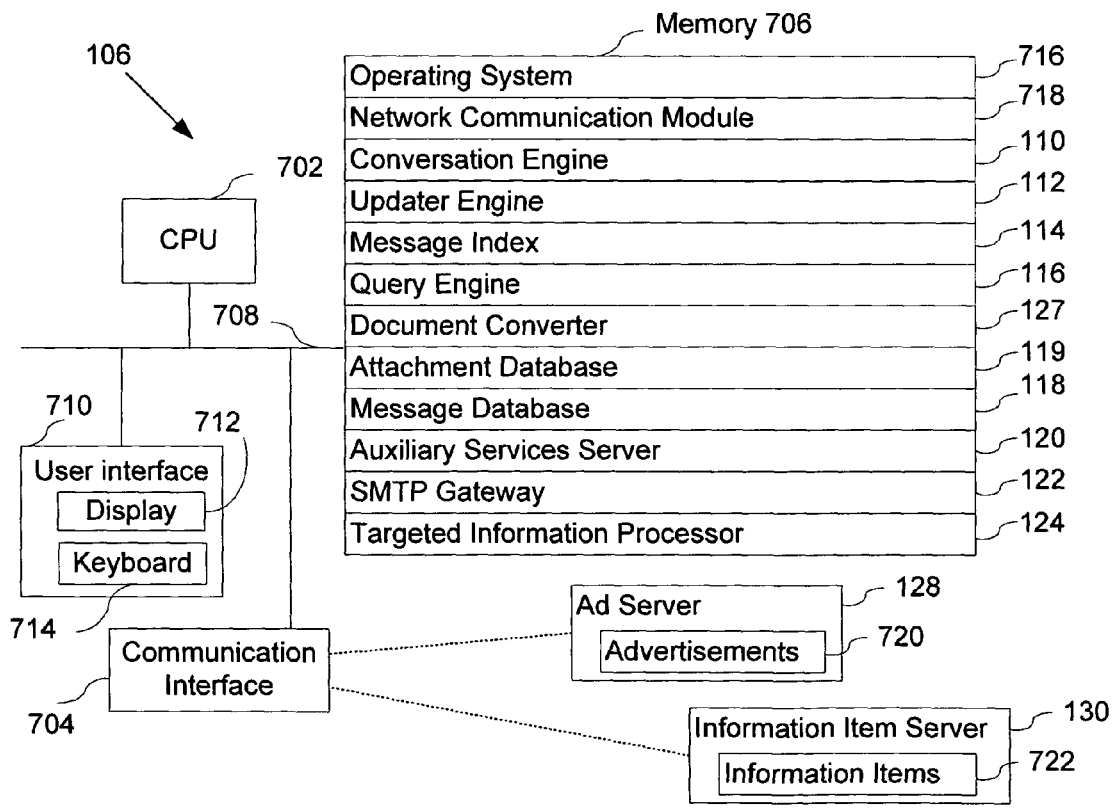
FIG. 7 is a block diagram of an exemplary email service in accordance with some embodiments of the present invention.

FIG. 7 is a block diagram of an exemplary email service 106 in accordance with some embodiments of the present invention. The email service 106 typically includes one or more processing units (CPUs) 702, one or more network or other communications interfaces 704, memory 706, and one or more communication buses 708 for interconnecting these components. The email service 106 optionally may include a user interface 710 comprising a display device 712 and a keyboard 714. Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 may optionally include one or more storage devices remotely located from the CPU(s) 702. In some embodiments, memory 706 stores the following programs, modules and data structures, or a subset thereof:

- an operating system 716 that includes procedures for handling various basic system services and for performing hardware dependent tasks;
- a network communication module 718 that is used for connecting the email service 106 to other computers via the one or more communication network interfaces 704 and one or more communication networks, such as the Internet, other wide area networks, local area networks, metropolitan area networks, and so on; and
- optionally, a targeted information processor 124 for obtaining targeted information for one or more identified messages as described above.

In some embodiments, the email service 106 includes the following elements, or a subset or superset of such elements: a conversation engine 110 for responding to a variety of requests from the client assistant 134 returning conversation-based responses; an updater engine 112 for updating a message database 118 and an attachment database 119; a message index 114 containing index information for messages in the message database 118 and attachments in the attachment database 119; a query engine 116 for searching the message database 118 and attachment database 119 using the message index 114; an auxiliary services server 120 for performing various auxiliary services; and an SMTP gateway 122 for sending and receiving messages including associated attachments.

The email service 106 can be connected to ad server 128 and/or information item server 130 via the communication interface 704. Ad server 128 can contain one or more advertisements 720. The ad server 128 can receive input and return advertisements that can be relevant to the input. The information item server 130 can include one or more information items 722. Similar to the ad server 128, the information server 130 can receive input and return informational items that can be relevant to the input.

Each of the above identified software elements in FIGS. 6 and 7 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 606 may store a subset of the modules and data structures identified above. Furthermore, memory 606 (FIG. 6) may store additional modules and data structures not described above. Similarly, memory 706 (FIG. 7) may store a subset of the modules and data structures identified above, and furthermore, memory 706 may store additional modules and data structures not described above.

Although FIGS. 6 and 7 show respectively a client 102 and an email service 106, the figures are intended more as functional descriptions of the various features which may be present in a client and set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement an email service 106 and how features are allocated among them will vary from one implementation to another, and may depend in part on the amount of data traffic that the system must handle during peak usage periods as well as during average usage periods.

Viewing Email Attachments as Thumbnails

The aforementioned embodiments convert a non-HTML electronic message attachment into an HTML file in order to allow a recipient to view the attachment as an HTML file in a web browser window on a client device. But in many cases, a full rendition of an HTML version of the attachment is not needed by the user. Very often, even a quick preview of a small portion of an email attachment can help a recipient assess the content of the attachment and thereby determine whether he or she should download the full attachment. For example, if the electronic message attachment is a PowerPoint presentation, the recipient may find it sufficient, for purposes of deciding whether or not to download the attachment, to have a quick look of the first slide of the presentation. For example, the first slide of the presentation may include the title of the presentation. In any case, viewing the first slide of the presentation may be sufficient for the user to determine whether or not to download the entire PowerPoint presentation attachment.

Figure 8:
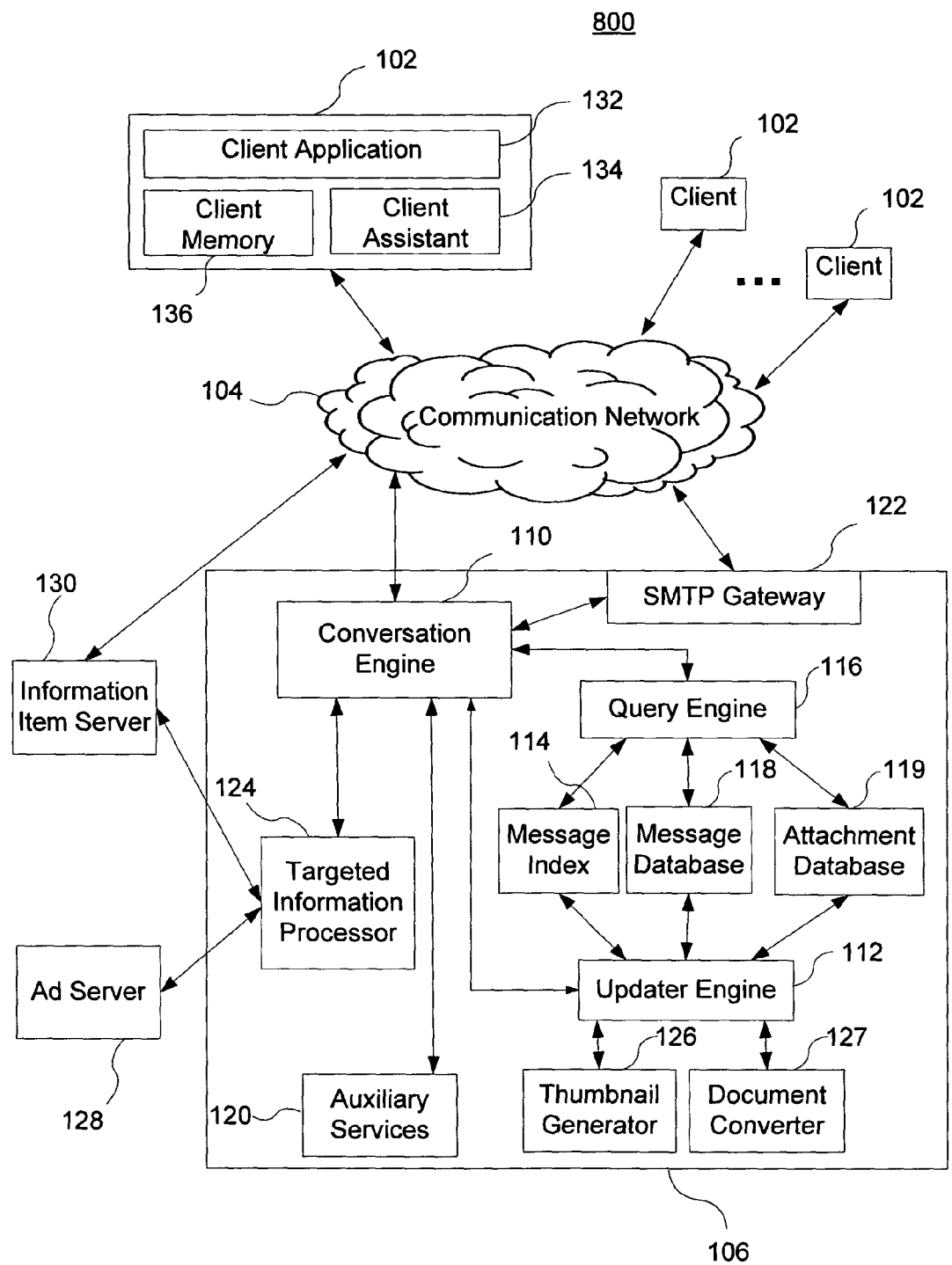
FIG. 8 is a block diagram of an exemplary environment that allows clients to view both email messages and associated attachments as thumbnails in accordance with some embodiments of the present invention.

One way of providing a preview of an email attachment according to some embodiments of the present invention is to generate an image, e.g., a thumbnail, from a portion of the attachment's content. FIG. 8 is a block diagram of an exemplary system 800 that allows clients to view both email messages and associated attachments as thumbnails. Note that system 800 is very similar to system 100 shown in FIG. 1 except that the email service 106 in FIG. 8 includes a thumbnail generator 126 in addition to a document converter 127. The thumbnail generator 126 is connected to the updater engine 112. In some embodiments, the thumbnail generator 126 includes at least two sub-modules. One sub-module is responsible for converting an email attachment into a high resolution image (herein defined to mean images having 400 or more pixels in each dimension; an exemplary high resolution image size is 640×480 pixels) and another module is responsible for resizing (e.g., sub-sampling) the image into a low resolution image, typically called a thumbnail or thumbnail image. The low resolution images (herein defined to mean images having 250 pixels or less in each dimension; two exemplary thumbnail image sizes are 235×180 pixels and 138×180 pixels) are included in an email message as thumbnails of the corresponding attachments. The high resolution images may optionally be stored in the email service 106 for subsequent use; alternately, the high resolution images may be discarded after the corresponding thumbnail images are generated, thereby reducing the use of storage space. In some embodiments, these two sub-modules operate on a single server computer. In some other embodiments, however, the modules for generating the high resolution images and for generating the thumbnail images operate on different server computers.

Figure 9:
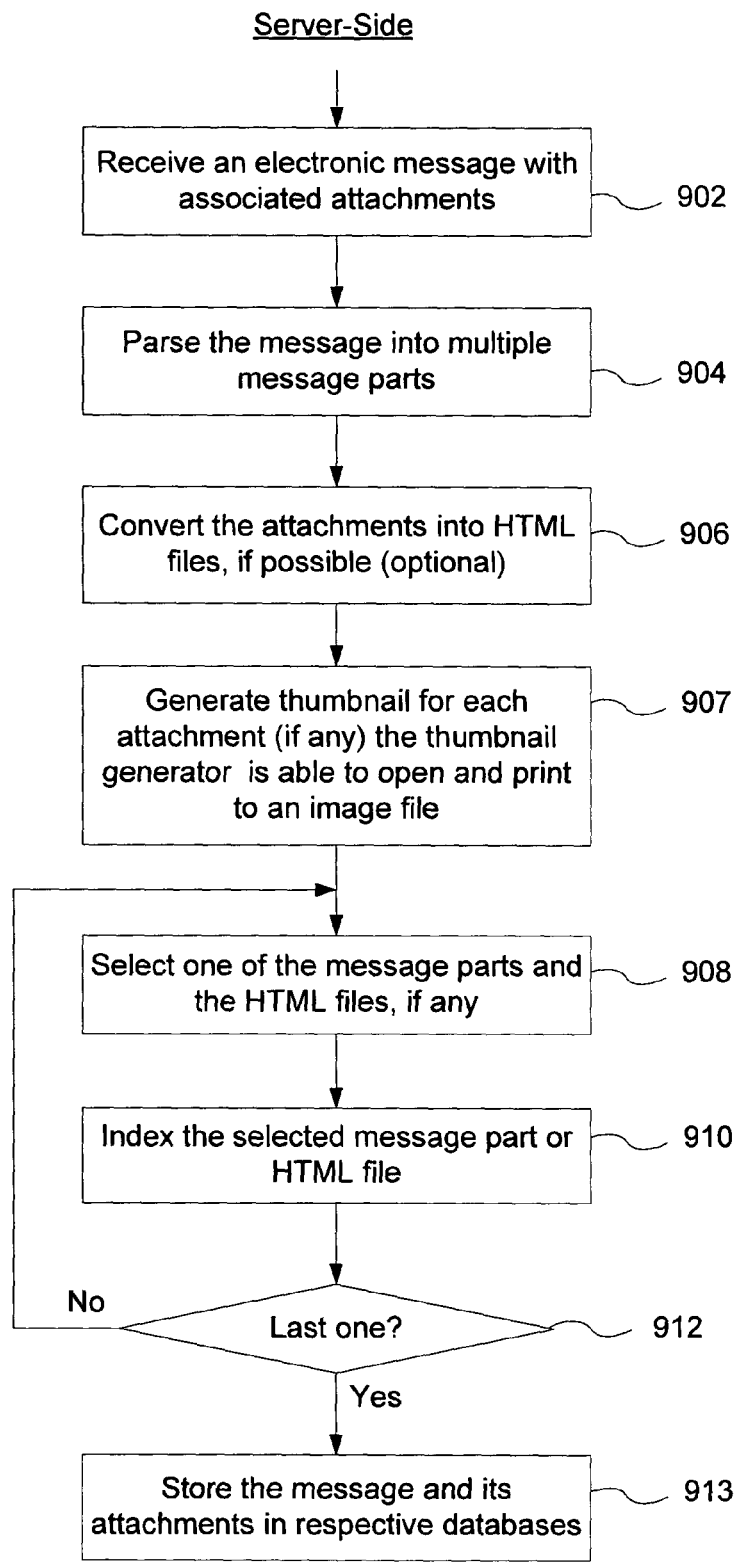
FIG. 9 is a flow diagram of a process of parsing and indexing an incoming electronic message and generating thumbnails for its associated attachments in accordance with some embodiments of the present invention.

FIG. 9 is a flow diagram of a process of parsing and indexing an incoming electronic message and generating thumbnails for its associated attachments in accordance with some embodiments of the present invention. Compared with the process shown in FIG. 2A, this process includes an additional operation 907 of generating a thumbnail for each attachment that the thumbnail generator 126 is able to open and "print" to an image file, sometimes called a "thumbnail." In some embodiments, the email service 106 maintains a list of the attachment types (also called document or file types) that the thumbnail generator 126 is able to open and print to an image file. Thumbnails are generated for attachments whose type is found on the list, but not for attachments whose type is either unknown or whose type is not found on the list.

The thumbnails for an electronic message's attachments are subsequently sent to a requesting client as part of a server response to a client request for the electronic message. In some embodiments, when the attachment corresponds to a document having more than one page, or whose length or volume is inconsistent with viewing the document on a single page, the thumbnail generator 126 generates a thumbnail image only for an initial portion (e.g., the first page, slide, or frame) of the attachment. In one embodiment, the thumbnails are stored in the attachment database 119 together with their corresponding attachments. In yet another embodiment, the thumbnails are stored in the message database 118 together with their associated messages.

Figure 10A:
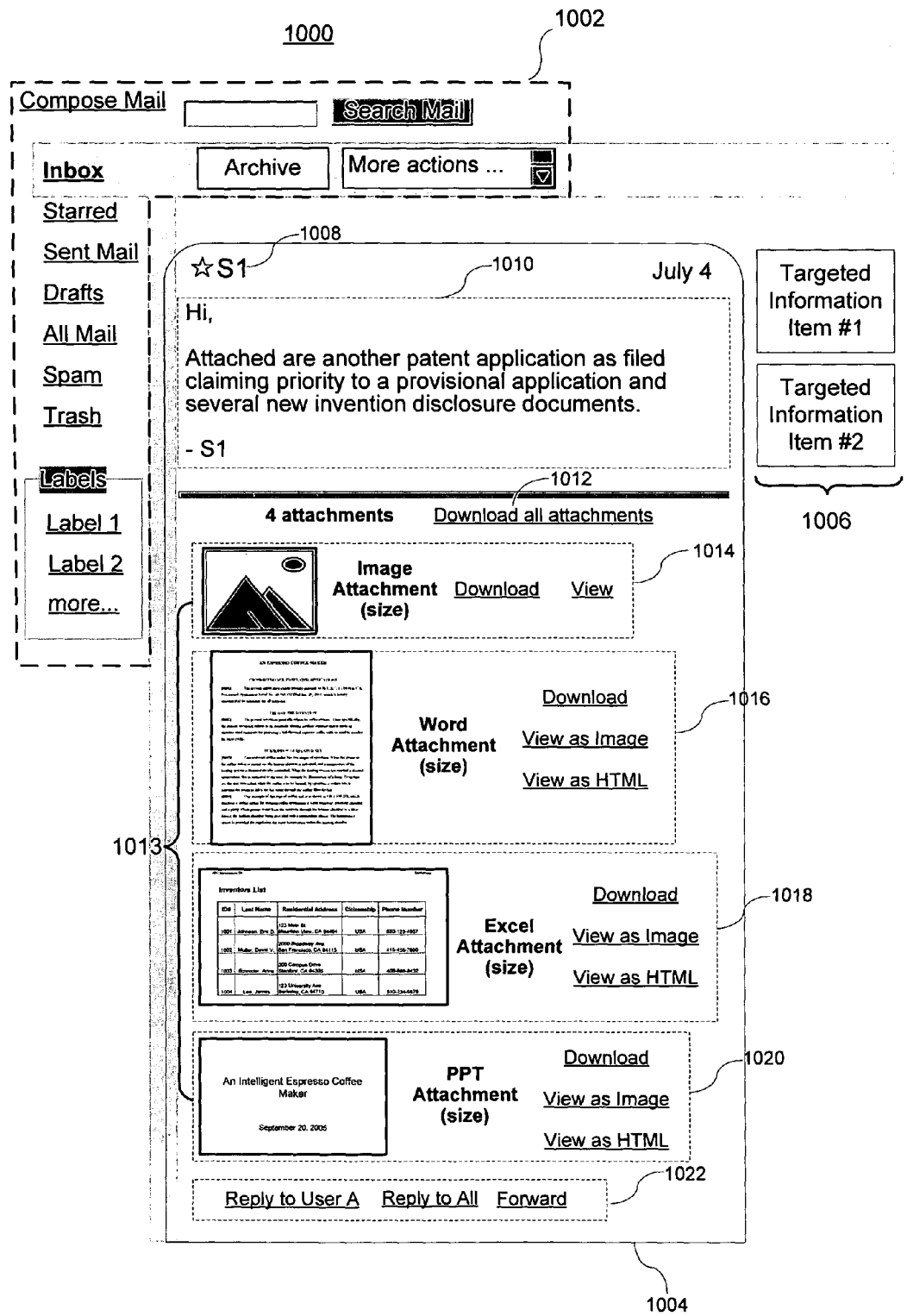
FIG. 10A illustrates an exemplary schematic screenshot of an electronic message in a client application including multiple attachment thumbnails in accordance with some embodiments of the present invention.
Figure 10B:
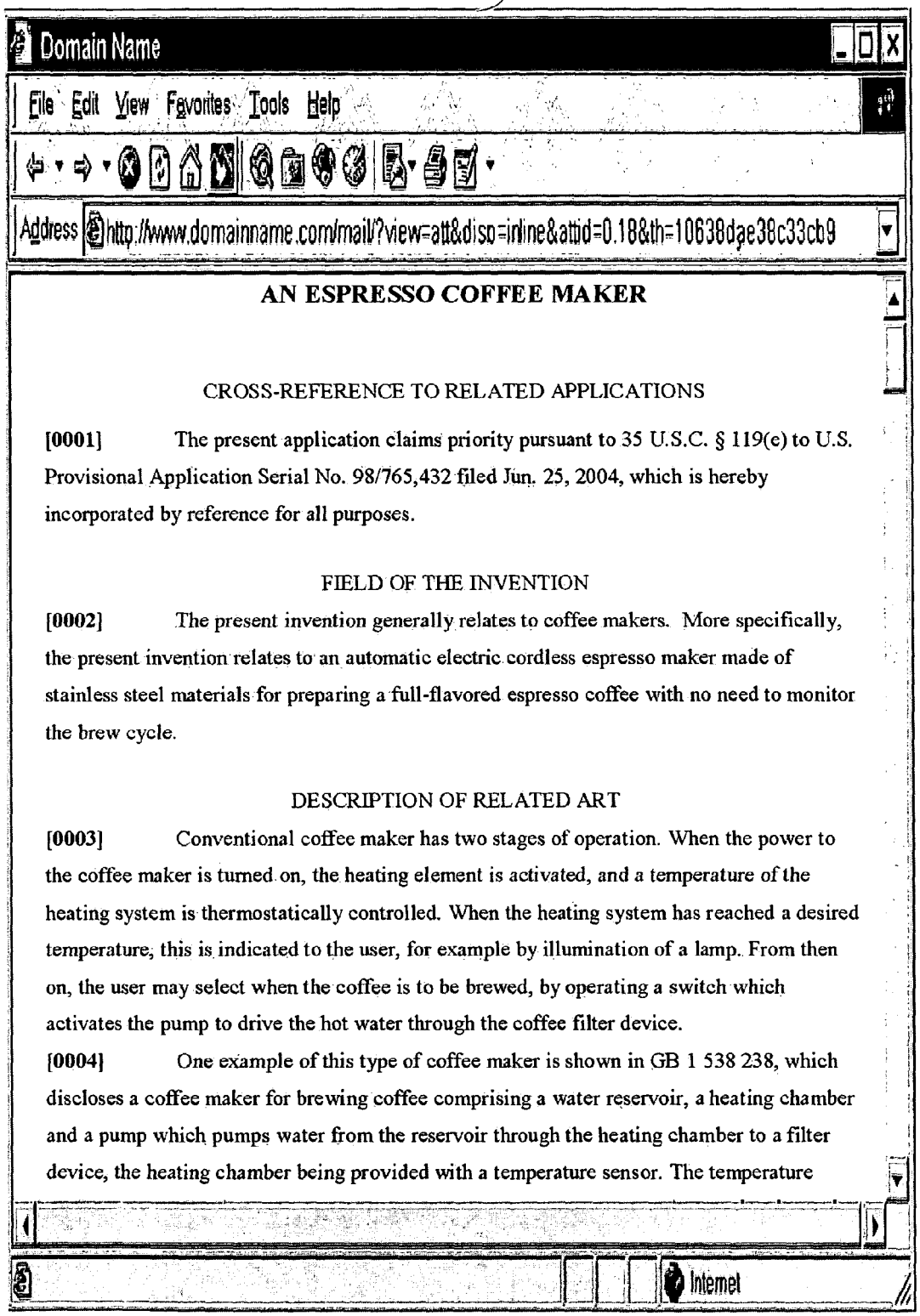
FIG. 10B illustrates an exemplary schematic screenshot of a MS-Word document viewed as an image in a web browser window in response to a user selection of a corresponding thumbnail in accordance with some embodiments of the present invention.

In some embodiments, instead of being pre-generated during initial processing of electronic messages received at the email service 106, the thumbnails are generated by the thumbnail generator 126 on the fly while the email service 106 is preparing a response to a client request. In some other embodiments, the thumbnail generator 126 may generate two or more images of different resolutions for each attachment. A thumbnail image of lower resolution is included in the email service 106's response to a request for the electronic message, and an image of higher resolution is prepared for a subsequent display on the client computer in response to user selection of the thumbnail. FIGS. 10A and 10B are schematic screenshots illustrating in more detail the use of two images associated with an attachment.

FIG. 10A illustrates an exemplary schematic screenshot of an electronic message in a client application including four attachment thumbnails in accordance with some embodiments of the present invention. Attachment information row 1014 includes a thumbnail of an image attachment. When a user clicks on the "View" link, the full image attachment is rendered in a second web browser window. In some embodiments, the user can click on the thumbnail itself to activate the rendering of the full image attachment in the second web browser window.

Attachment information row 1016 includes a thumbnail of the first page of a MS-Word document including a title, a few sub-titles and a few paragraphs. In some cases, due to the small size and low resolution of the thumbnail image, a user may be able to only discern the general style of the attachment without being able to discern its content or subject. If the user is interested in learning more about the attachment, there are three options listed to the right of the file name. The "Download" link allows the user to download the attachment to the local computer. The "View as Image" link allows the user to view the image of the first page at a higher resolution. The "View as HTML" link allows the user to view an HTML version of the attachment. In some embodiments, the "View as Image" link is merged with the thumbnail of the attachment; as a result, the words "View as Image" no longer appear in the attachment information row. In these embodiments, the user can directly click on the thumbnail to view the attachment image of higher resolution. In some embodiments, the user can access the higher resolution image of the attachment simply by hovering a pointer (e.g., a mouse, trackball or track-pad pointer) over the thumbnail. Note that since the attachment image is pre-generated, e.g., when the corresponding message is first received at the email service 106, and the HTML version is generated on the fly, the user may get a faster response by clicking on the "View as Image" link. In some embodiments, when the user moves a pointer (e.g., a mouse cursor) over the thumbnail and keeps it there (sometimes called "hovering" over the link) for a predetermined time period (e.g., at least one second), the client will send a request to the email service for the image of higher resolution. Similarly, in some embodiments, selecting (e.g., clicking on) the thumbnail causes the client to send a request to the email service for a higher resolution image of the attachment. In some embodiments, the request to the email service includes a URL and multiple pairs of parameters and values, for example for identifying the attachment and for indicating what is being requested (i.e., a high resolution image).

In some embodiments, the email service 106 does not pre-generate and store an attachment image of higher resolution when the attachment first arrives at the email service 106. Alternately, the email server 106 generates the higher resolution attachment image when generating the corresponding thumbnail image, but does not store the higher resolution attachment image. Rather, the attachment image of higher resolution is generated on the fly, for example, when a user requests the higher resolution attachment image. As a result, less computer resources such as CPU time and storage space are needed for processing the email attachments when they reach the email service 106.

In some other embodiments, the attachment image of higher resolution is sent to the client in response to a client request for the email message. But the attachment image of higher resolution is initially invisible to the user because it is provided to the client in a hidden Cascading Style Sheet (CSS) layer or a hidden frame. In some embodiments, other mechanisms may be used to initially hide the higher resolution attachment image. The attachment image of higher resolution is visible to the user only when the user moves the mouse cursor over the attachment's thumbnail image, or when the user clicks on the attachment's thumbnail image. In this case, it takes less time for the attachment image of higher resolution to be rendered in the web browser window, because the higher resolution attachment image is already stored at the client when the user requests it. However, delivery of the email message to the client may be delayed briefly by the processing required to generate the higher resolution thumbnail image. In yet another embodiment, the attachment image of higher resolution is generated by the email service 106 after the email service 106 transfers the email message to the client, for instance while the user is viewing the message body. When the user moves the mouse cursor over a thumbnail of an attachment, the email service then transfers the corresponding attachment image of higher resolution to the client. When the user subsequently navigates away from the email message, the attachment image of higher resolution is discarded by the email service 106 to save storage space.

In some embodiments, when the user clicks on a "View as Image" link or keeps the mouse cursor over a thumbnail for a predetermined time period to view the image of higher resolution, the image is not rendered in a separate browser window. Rather, the image of higher resolution appears in the same web browser window shown in FIG. 10A, but replaces the corresponding thumbnail of the attachment. In this event, the web browser window is redrawn to display the new web page in a predefined manner. From the user's perspective, a "zoom-in" or magnify operation is performed on the thumbnail image.

Similar to attachment information row 1016, attachment information row 1018 includes a thumbnail of a spreadsheet document. In this example, the font used by the spreadsheet is larger than that of the MS-Word document, allowing the user to discern the content or subject of the attachment from the thumbnail. Attachment information row 1020 includes a thumbnail of the first slide of a PowerPoint presentation. Both the title and the date of the presentation can be discerned from the thumbnail. Thus, a brief inspection of the thumbnails in row 1018 and 1020 provides the user with a reasonable understanding of the content of the respective attachments, and based on this information the user can make an informed decision whether or not to download each of these attachments.

FIG. 10B illustrates an exemplary schematic screenshot of the MS-Word attachment viewed as an image in a second web browser window in response to a user selection of a corresponding thumbnail in row 1016 of FIG. 10A in accordance with some embodiments of the present invention. In some embodiments, this second image of higher resolution is pre-generated with the thumbnail of the attachment when the attachment arrives at the email service 106. In these embodiments, the second image is kept in the email service 106 to reduce the system 800's response time to a request for the image. Upon user selection of the thumbnail or the "View as Image" link, the email service 106 identifies the image of higher resolution and sends a copy of the image to the client computer for rendering in a second web browser window. In some other embodiments, the second image of higher resolution is generated on the fly by the email service 106 when the user selects the corresponding thumbnail by clicking a mouse cursor on the thumbnail or keeping the mouse cursor over the thumbnail for a predetermined time period. Upon generating the higher resolution attachment image, the email service 106 sends it to the client computer for rendering in a second web browser window.

Figure 11:
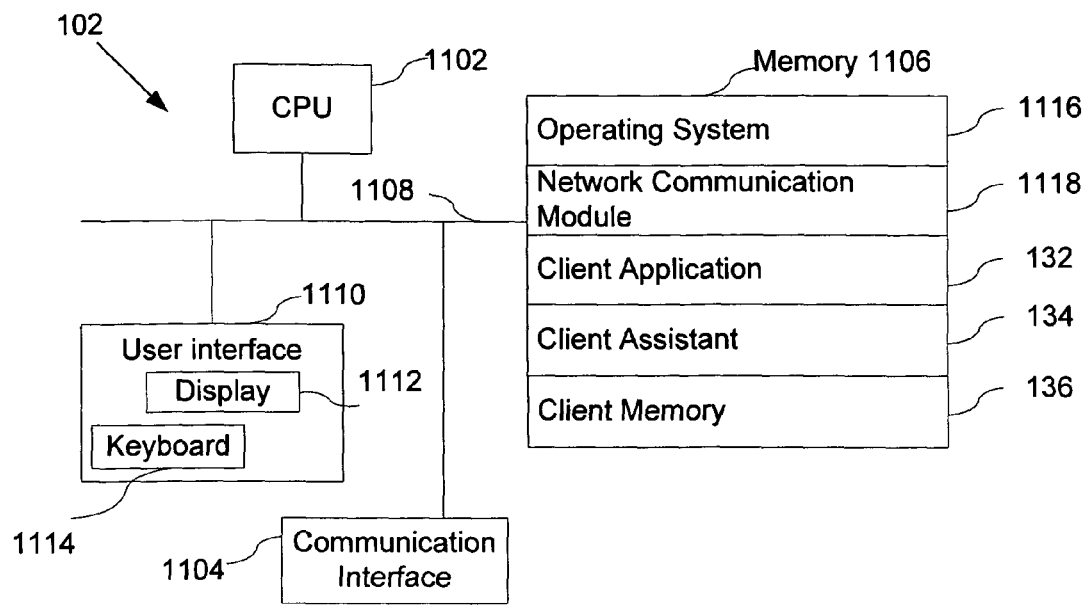
FIG. 11 is a block diagram of an exemplary client in accordance with some embodiments of the present invention.
Figure 12:
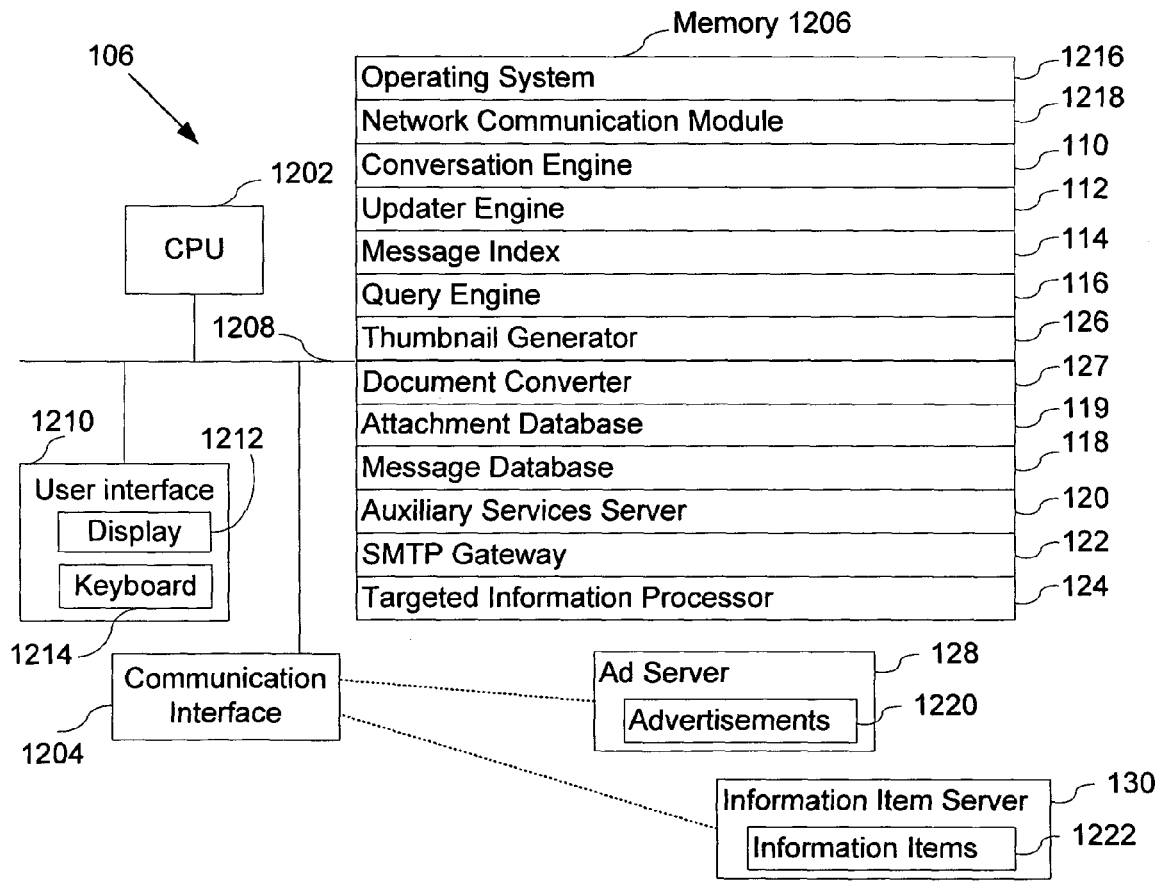
FIG. 12 is a block diagram of an exemplary email service in accordance with some embodiments of the present invention.

FIGS. 11 and 12 are block diagrams of exemplary client and email service in accordance with some embodiments of the present invention. These figures are similar to FIGS. 6 and 7, respectively. One difference is that memory 1206 of the email service 106 includes both a thumbnail generator 126 and a document converter 127. The discussion of the client 102 and the email service 106 above in connection with FIGS. 6 and 7 is hereby incorporated for reference.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of displaying attachments associated with an electronic message, comprising:
    at a client computer having one or more processors and memory:
    in response to a single user selection of a link to an electronic message:
        fetching from a document storage system an electronic message and attachment information associated with at least two attachments of the electronic message, the attachment information including a plurality of images and a plurality of links; and
        simultaneously displaying, in an instance of a client application: the electronic message and the attachment information, wherein:
            the at least two attachments include a first attachment and a second attachment; and
            the attachment information is displayed as a multi-row table including a first row and a second row that are simultaneously displayed in response to the single user selection of the link to the electronic message, wherein:
                the first row includes a first image representing the first attachment, a first download link for the first attachment and a first view link for the first attachment; and
                the second row includes a second image representing the second attachment, a second download link for the second attachment and a second view link for the second attachment;
        wherein:
            when a respective view link associated with a respective attachment is selected by the user, a representation of the respective attachment is displayed at the client computer,
            when a respective download link associated with a respective attachment is selected by the user, the respective attachment is downloaded to a location on the client computer,
            the first image is a thumbnail image corresponding to at least a predefined portion of the first attachment, and
            the second image is a thumbnail image corresponding to at least a predefined portion of the second attachment.

2. The method of claim 1, wherein:
    the attachment information includes a set of at least two images generated based on a respective attachment, each respective image in the set of images corresponding to at least a same predefined portion of the respective attachment and having different resolution and size.

3. The method of claim 1, including: initially displaying the electronic message and the first image, and subsequently, in response to a predefined user action, displaying a representation of the first attachment having a higher resolution than the first image, wherein the predefined user action comprises selecting the first image.

4. A method of supplying attachments associated with an electronic message, comprising:
    at a server system having one or more processors and memory;
    sending to a client computer an electronic message and attachment information associated with at least two attachments of the electronic message, the attachment information including a plurality of images and a plurality of links, wherein:
        the electronic message and the attachment information are for simultaneous display in a single instance of a client application on the client computer;
        the at least two attachments include a first attachment and a second attachment; and
        the attachment information is for display as a multi-row table including a first row and a second row, wherein:
            the first row includes a first image representing the first attachment, a first download link for the first attachment and a first view link for the first attachment; and
            the second row includes a second image representing the second attachment, a second download link for the second attachment and a second view link for the second attachment; and
    receiving a request corresponding to a user selection of one of the links, and in response to the request:
        when the selected link is a respective view link associated with a respective attachment, identifying a representation of the respective attachment and transferring to the client computer the representation of the respective attachment for display at the client computer, and
        when the selected link is a respective download link associated with a respective attachment, identifying the respective attachment corresponding to the download link, and transferring the respective attachment to a location on the client computer,
    wherein
    the first row and second row are for simultaneous display on the client computer in response to a single user request for the electronic message,
    the first image is a thumbnail image corresponding to at least a predefined portion of the first attachment, and
    the second image is a thumbnail image corresponding to at least a predefined portion of the second attachment.

5. The method of claim 4, wherein the attachment information for a respective attachment includes a set of at least two images generated based on the respective attachment, each respective image in the set of images corresponding to at least a same predefined portion of the respective attachment, and having different resolution and size.

6. A system for serving an electronic message and its associated attachment information in response to client requests, comprising:
   memory;
   one or more processors; and
   at least one program, stored in the memory and executed by the one or more processors, the at least one program including instructions for:
   sending a response to a client computer, the response including an electronic message and attachment information associated with at least two attachments of the electronic message, the attachment information including a plurality of images and a plurality of links, wherein:
      the electronic message and the attachment information are for simultaneous display in a single instance of a client application on the client computer;
      the at least two attachments include a first attachment and a second attachment; and
      the attachment information is for display as a multi-row table including a first row and a second row, wherein:
         the first row includes a first image representing the first attachment, a first download link for the first attachment and a first view link for the first attachment; and
         the second row includes a second image representing the second attachment, a second download link for the second attachment and a second view link for the second attachment; and
   receiving a request from the client computer, the request corresponding to a user selection of one of the links, and in response to the request:
      when the selected link is a respective view link associated with a respective attachment, identifying a representation of the respective attachment and transferring to the client computer the representation of the respective attachment for display at the client computer, and
      when the selected link is a respective download link associated with a respective attachment, identifying the respective attachment corresponding to the download link, and transferring the respective attachment to a location on the client computer;
   wherein
   the first row and second row are for simultaneous display on the client computer in response to a single user request for the electronic message,
   the first image is a thumbnail image corresponding to at least a predefined portion of the first attachment, and
   the second image is a thumbnail image corresponding to at least a predefined portion of the second attachment.

7. The system of claim 6, wherein the attachment information for a respective attachment includes a set of at least two images generated based on the respective attachment, each respective image in the set of images corresponding to at least a same predefined portion of the respective attachment, and having different resolution and size.

8. A non-transitory computer readable storage medium storing one or more programs for execution by a server system having one or more processors, the one or more programs comprising:
   instructions for sending a response to a client computer, the response including an electronic message and attachment information associated with at least two attachments of the electronic message, the attachment information including one or more images and a plurality of links; wherein:
      the electronic message and the attachment information are for simultaneous display in a single instance of a client application on the client computer;
      the at least two attachments include a first attachment and a second attachment; and
      the attachment information is for display as a multi-row table including a first row and a second row, wherein:
         the first row includes a first image representing the first attachment, a first download link for the first attachment and a first view link for the first attachment; and
         the second row includes a second image representing the second attachment, a second download link for the second attachment and a second view link for the second attachment; and
   instructions for receiving a request from the client computer, the request corresponding to a single predefined user selection of one of the links;
   instructions for responding to the request when the selected link is a respective view link associated with a respective attachment, by identifying a representation of the respective attachment and transferring to the client computer the representation of the respective attachment for display at the client computer, and
   instructions for responding to the request when the selected link is a respective download link associated with a respective attachment, by identifying the respective attachment corresponding to the download link, and transferring the respective attachment to a location on the client computer;
   wherein
   the first row and second row are for simultaneous display on the client computer in response to a single user request for the electronic message,
   the first image is a thumbnail image corresponding to at least a predefined portion of the first attachment, and
   the second image is a thumbnail image corresponding to at least a predefined portion of the second attachment.

9. The computer readable storage medium of claim 8, wherein the attachment information for a respective attachment includes a set of at least two images generated based on the respective attachment, each respective image in the set of images corresponding to at least a same predefined portion of the respective attachment, and having different resolution and size.

10. The method of claim 1, wherein the attachment information includes, for a respective attachment of the at least two attachments, a thumbnail image of content of at least a predefined portion of the respective attachment, and the respective attachment is selected from the group consisting of a word-processor document, a spreadsheet document, and a presentation document.

11. The method of claim 4, wherein the attachment information includes, for a respective attachment of the at least two attachments, a thumbnail image of content of at least a predefined portion of the respective attachment, and the respective attachment is selected from the group consisting of a word-processor document, a spreadsheet document, and a presentation document.

12. The system of claim 6, wherein the attachment information includes, for a respective attachment of the at least two attachments, a thumbnail image of content of at least a predefined portion of the respective attachment, and the respective attachment is selected from the group consisting of a word-processor document, a spreadsheet document, and a presentation document.

13. The computer readable storage medium of claim 8, wherein each of the one or more images associated with a respective attachment of the at least two attachments is a thumbnail image of content of at least a predefined portion of the respective attachment, and the respective attachment is selected from the group consisting of a word-processor document, a spreadsheet document, and a presentation document.

14. The method of claim 1, wherein:
   the first download link and the first view link are aligned horizontally in the multi-row table; and
   the second download link and the second view link are aligned horizontally in the multi-row table.

15. The method of claim 1, wherein:
   in the first row the first image is displayed to the left of the first download link and the first view link; and
   in the second row the second image is displayed to the left of the second download link and the second view link.

16. The method of claim 15, wherein:
   in the first row the first download link is vertically adjacent to the first view link; and
   in the second row the second download link is vertically adjacent to the second view link.

17. The method of claim 15, wherein:
   in the first row the first download link is horizontally adjacent to the first view link; and
   in the second row the second download link is horizontally adjacent to the second view link.

18. The method of claim 4, including: sending instructions to the client enabling the client to initially display the electronic message and the first image, and subsequently, in response to a predefined user action, display a representation of the first attachment having a higher resolution than the first image, wherein the predefined user action comprises selecting the first image.

19. The method of claim 4, wherein, within the multi-row table:
   the first download link and the first view link are aligned horizontally in the multi-row table; and
   the first view link and the second view link are aligned vertically in the multi-row table.

20. The method of claim 4, wherein:
   in the first row the first image is for display to the left of the first download link and the first view link; and
   in the second row the second image is for display to the left of the second download link and the second view link.

21. The system of claim 6, the at least one program including instructions for: sending instructions to the client enabling the client to initially display the electronic message and the first image, and subsequently, in response to a predefined user action, display a representation of the first attachment having a higher resolution than the first image, wherein the predefined user action comprises selecting the first image.

22. The system of claim 6, wherein, within the multi-row table:
   the first download link and the first view link are aligned horizontally in the multi-row table; and
   the first view link and the second view link are aligned vertically in the multi-row table.

23. The system of claim 6, wherein:
   in the first row the first image is for display to the left of the first download link and the first view link; and
   in the second row the second image is for display to the left of the second download link and the second view link.

24. The computer readable storage medium of claim 8, including instructions which cause the server system to: send instructions to the client enabling the client to initially display the electronic message and the first image, and subsequently, in response to a predefined user action, display a representation of the first attachment having a higher resolution than the first image, wherein the predefined user action comprises selecting the first image.

25. The computer readable storage medium of claim 8, wherein, within the multi-row table:
   the first download link and the first view link are aligned horizontally in the multi-row table; and
   the first view link and the second view link are aligned vertically in the multi-row table.

26. The computer readable storage medium of claim 8, wherein:
   in the first row the first image is for display to the left of the first download link and the first view link; and
   in the second row the second image is for display to the left of the second download link and the second view link.

27. A system for displaying attachments associated with an electronic message, comprising:
   memory;
   one or more processors; and
   at least one program, stored in the memory and executed by the one or more processors, the at least one program including instructions for:
   in response to a single user selection of a link to an electronic message:
      fetching from a document storage system an electronic message and attachment information associated with at least two attachments of the electronic message, the attachment information including a plurality of images and a plurality of links; and
      simultaneously displaying, in an instance of a client application: the electronic message and the attachment information, wherein:
         the at least two attachments include a first attachment and a second attachment; and
         the attachment information is displayed as a multi-row table including a first row and a second row, wherein:
            the first row includes a first image representing the first attachment, a first download link for the first attachment and a first view link for the first attachment; and
            the second row includes a second image representing the second attachment, a second download link for the second attachment and a second view link for the second attachment;
   wherein:
      when a respective view link associated with a respective attachment is selected by the user, a representation of the respective attachment is displayed at the client computer,
      when a respective download link associated with a respective attachment is selected by the user, the respective attachment is downloaded to a location on the client computer,
      the first row and second row are for simultaneous display by the system in response to the single user selection of the link to the electronic message,
      the first image is a thumbnail image corresponding to at least a predefined portion of the first attachment, and
      the second image is a thumbnail image corresponding to at least a predefined portion of the second attachment.

28. The system of claim 27, wherein: the attachment information fetched from the document database in response to the single user selection of a link includes a set of at least two images generated based on a respective attachment, each respective image in the set of images corresponding to at least a same predefined portion of the respective attachment and having different resolution and size.

29. The system of claim 27, the at least one program including instructions for: initially displaying the electronic message and the first image, and subsequently, in response to a predefined user action, displaying a representation of the first attachment having a higher resolution than the first image, wherein the predefined user action comprises selecting the first image.

30. The system of claim 27, wherein each of the one or more images associated with a respective attachment of the at least two attachments is a thumbnail image of content of at least a predefined portion of the respective attachment, and the respective attachment is selected from the group consisting of a word-processor document, a spreadsheet document, and a presentation document.

31. The system of claim 27, wherein, within the multi-row table:
the first download link and the first view link are aligned horizontally in the multi-row table; and
the first view link and the second view link are aligned vertically in the multi-row table.

32. The system of claim 27, wherein, within the multi-row table:
in the first row the first image is displayed to the left of the first download link and the first view link; and
in the second row the second image is displayed to the left of the second download link and the second view link.

33. A non-transitory computer readable storage medium storing one or more programs, the one or more programs comprising instructions, which when executed by a client computer with one or more processors, cause the client computer to:
in response to a single user selection of a link to an electronic message:
fetch from a document storage system an electronic message and attachment information associated with at least two attachments of the electronic message, the attachment information including a plurality of images and a plurality of links; and
simultaneously display, in an instance of a client application: the electronic message and the attachment information, wherein:
the at least two attachments include a first attachment and a second attachment; and
the attachment information is displayed as a multi-row table including a first row and a second row, wherein:
the first row includes a first image representing the first attachment, a first download link for the first attachment and a first view link for the first attachment; and
the second row includes a second image representing the second attachment, a second download link for the second attachment and a second view link for the second attachment;
wherein:
when a respective view link associated with a respective attachment is selected by the user, a representation of the respective attachment is displayed at the client computer,
when a respective download link associated with a respective attachment is selected by the user, the respective attachment is downloaded to a location on the client computer,
the first row and second row are for simultaneous display on the client computer in response to the single user selection of the link to an electronic message,
the first image is a thumbnail image corresponding to at least a predefined portion of the first attachment, and
the second image is a thumbnail image corresponding to at least a predefined portion of the second attachment.

34. The computer readable storage medium of claim 33, wherein: the attachment information fetched from the document database in response to the single user selection of a link, includes a set of at least two images generated based on a respective attachment, each respective image in the set of images corresponding to at least a same predefined portion of the respective attachment and having different resolution and size.

35. The computer readable storage medium of claim 33, including instructions which cause the client computer to: initially display the electronic message and the first image, and subsequently, in response to a predefined user action, display a representation of the first attachment having a higher resolution than the first image, wherein the predefined user action comprises selecting the first image.

36. The computer readable storage medium of claim 33, wherein each of the one or more images associated with a respective attachment of the at least two attachments is a thumbnail image of content of at least a predefined portion of the respective attachment, and the respective attachment is selected from the group consisting of a word-processor document, a spreadsheet document, and a presentation document.

37. The computer readable storage medium of claim 33, wherein:
the first download link and the first view link are aligned horizontally in the multi-row table; and
the first view link and the second view link are aligned vertically in the multi-row table.

38. The computer readable storage medium of claim 33, wherein:
in the first row the first image is displayed to the left of the first download link and the first view link; and
in the second row the second image is displayed to the left of the second download link and the second view link.

* * * * *